(12) United States Patent
Peglow et al.

(10) Patent No.: US 8,053,039 B2
(45) Date of Patent: Nov. 8, 2011

(54) POLYMERIZABLE DICHROIC AZO DYES

(75) Inventors: Thomas Peglow, Lorrach (DE); Franco Moia, Frenkendorf (CH); Zoubair Mohammed Cherkaoui, Niederdorf (CH); Mario Schwab, Freiburg (DE)

(73) Assignee: Rolic AG, Zug (CH)

( * ) Notice: Subject to any disclaimer, the term of this patent is extended or adjusted under 35 U.S.C. 154(b) by 1249 days.

(21) Appl. No.: 10/550,454

(22) PCT Filed: Mar. 23, 2004

(86) PCT No.: PCT/CH2004/000177
§ 371 (c)(1),
(2), (4) Date: Mar. 10, 2006

(87) PCT Pub. No.: WO2004/085547
PCT Pub. Date: Oct. 7, 2004

(65) Prior Publication Data
US 2006/0188663 A1    Aug. 24, 2006

(30) Foreign Application Priority Data
Mar. 26, 2003  (EP) .................................. 03405207

(51) Int. Cl.
C09K 19/22 (2006.01)
C09K 19/60 (2006.01)
C09B 44/08 (2006.01)
C08F 126/02 (2006.01)
C08F 132/08 (2006.01)
C08G 63/44 (2006.01)
G02B 5/30 (2006.01)
C07D 239/70 (2006.01)
C07D 221/04 (2006.01)

(52) U.S. Cl. ...... 428/1.1; 428/1.2; 428/1.31; 252/299.1; 252/299.68; 534/610; 534/612; 526/259; 528/363; 544/245; 544/246; 546/112; 546/277.1

(58) Field of Classification Search ................ 428/1.1, 428/1.2, 1.3, 1.31; 252/299.1, 299.68; 534/610, 534/612; 526/259; 528/363; 544/245, 246; 546/112, 277.1
See application file for complete search history.

(56) References Cited

U.S. PATENT DOCUMENTS

| | | | |
|---|---|---|---|
| 4,493,532 A * | 1/1985 | Kaneko et al. ............... 349/165 |
| 5,389,698 A | 2/1995 | Chigrinov et al. | |
| 5,602,661 A | 2/1997 | Schadt et al. | |
| 5,838,407 A | 11/1998 | Chigrinov et al. | |
| 6,144,428 A | 11/2000 | Schadt et al. | |
| 6,160,597 A | 12/2000 | Schadt et al. | |
| 6,300,991 B1 | 10/2001 | Schadt et al. | |
| 6,686,980 B1 * | 2/2004 | Ichihashi .................. 349/96 |
| 7,419,620 B2 * | 9/2008 | Buchecker et al. ...... 252/299.01 |
| 2004/0164272 A1 * | 8/2004 | Buchecker et al. ...... 252/299.01 |

FOREIGN PATENT DOCUMENTS

| EP | 1209515 A1 | 5/2002 |
|---|---|---|
| EP | 1256602 A1 | 11/2002 |
| JP | 2001133630 | * 5/2001 |

OTHER PUBLICATIONS

CAPLUS 1993: 672,175.*
Patent Abstracts of Japan, vol. 10, No. 31 (C-327), Feb. 6, 1986 & JP 60 184564 A (Mitsui Toatsu Kagaku KK), Sep. 20, 1985, Examples 3, 11, 23, 24.
Patent Abstracts of Japan, vol. 11, No. 63 (C-406), Feb. 26, 1987 & JP 61 221267 A (Mitsu Toatsu Chem Inc), Oct. 1, 1986.
Patent Abstracts of Japan, vol. 10, No. 139 (C-348), May 22, 1986 & JP 60 262858 A (Mitsui Toatsu Kagaku KK), Dec. 26, 1985.

* cited by examiner

*Primary Examiner* — Shean Wu
(74) *Attorney, Agent, or Firm* — Sughrue Mion, PLLC

(57) ABSTRACT

The present invention is directed towards polymerizable dichroic azo dyes comprising azo-chromophores having at least one standard mesogenic ring system attached to said chromophores and at least one polymerizable group leading to dyes having sufficient solubilty and a very high order parameter.

51 Claims, No Drawings

POLYMERIZABLE DICHROIC AZO DYES

The invention relates to new polymerizable dichroic azo dyes, mesogenic polymerizable mixtures containing the same and their use for the preparation of dichroic polymer networks and gels, which for instance may find application as uniform or patterned polarizers.

Many dyes have been developed for a variety of applications such as dyeing of fabrics, printing of textiles, coloring of plastics, color image formation in photography, etc. To provide the requisite properties, such as hue, solubility, affinity for the substrate, chemical resistance, and compatibility with the medium from which the dye is applied, the molecular structure and bond rigidity of the dye are specially designed for each application. Important properties required for the present application in mesogenic, polymerizable mixtures and dichroic polymer networks and gels, include the following: dichroism, solubility, high order parameter and stability of the dichroic polymer.

Dichroism is the property whereby an oriented assembly of dye molecules exhibits relatively low absorption of a given wavelength of light in one state of orientation and a relatively high absorption of the same wavelength in another state of orientation with respect to the polarization direction of the light source. The orientation of the dye molecules can be brought about for example by dissolution in a solvent of liquid crystals or by embedding the dye in a stretched plastic.

Solubility must be sufficiently high so that thin layers, e.g. in the range of micrometers, may contain enough dye molecules to have adequate light absorption in one of the orientate states. Ionic dyes will be generally inadequate because of their low solubility.

Order parameter is a quantitative measure of the degree of molecular order or alignment in a given system. High order parameter is promoted by dyes with elongated shape having a large ratio of molecular length to width, similar to the shape of molecules of the liquid crystal host material. To assure an elongated shape, the molecules should have a rigid structure, which can be obtained, for example, by a substantially linear arrangement of benzene or heterocyclic rings.

Brightness and contrast of dichroic polymer networks or gels are both related to the order parameter S of the dye, where $$S = D_\| - D_\perp / D_\| + 2 D_\perp$$

and $D_\|$ and $D_\perp$ are the optical densities of a dichroic dye in a liquid crystal measured for light polarizations parallel and perpendicular to the liquid crystal director.

Advantageously, the order parameter should exceed 0.70 and preferably should be as high as possible.

Stability of the dichroic polymer means that the properties of the polymer containing the dichroic dye should not alter during time due to diffusion processes or inhomogeneities caused by partial crystallization of the dye. It also means that the dichroic dyes should not migrate into adjacent layers if such polymers are designed for use in multilayer systems.

Various dichroic dyes have been proposed as materials, which fulfill partly the above-described requirements. There are, however, still drawbacks, which should be improved. In particular, those having high order parameters have poor solubility or cause instability of the dichroic polymer, and those showing good stability of the dichroic polymer do not have a high order parameter. Thus, there is clearly a need for a concept whereby all or at least some of the above-described requirements may be fulfilled.

With the forgoing in view, the present inventors have carried out extensive investigations and found that the incorporation of ring systems, which increase the width of the molecule, into azo-chromophores leads to dyes combining sufficient solubility and a very high order parameter, when at least one standard mesogenic ring system is attached at the chromophore, and that the above described stability problem can be overcome if the dichroic dye contains at least one polymerizable group.

Thus, in a first aspect the present invention provides a polymerizable dichroic azo dye of the general formula I:

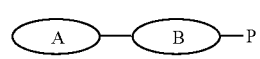

wherein:
A represents a dichroic residue, which may comprise one or more polymerizable groups PG, exhibiting at least partial absorption in the visible region between 400 nanometer and 800 nanometer and comprising at least one azo-binding group that is linked to at least one radical of formula a) to f) shown below,

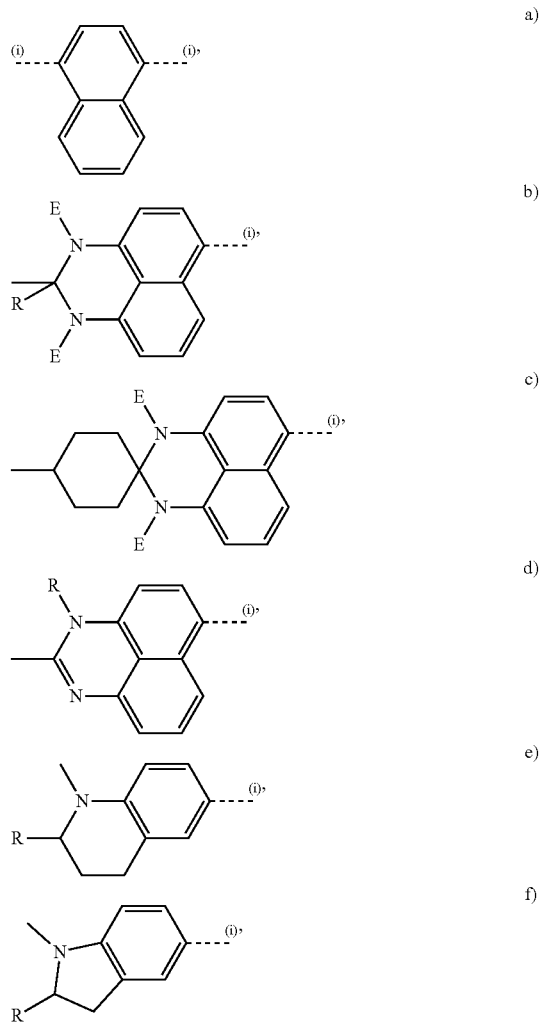

which radical of formula a) to f) may be unsubstituted, mono- or poly-substituted by fluorine, chlorine, hydroxy, —NR¹R² or by a straight chain or branched alkyl residue having 1-10 carbon atoms, which alkyl residue is unsubstituted, mono- or poly-substituted by fluorine, and wherein one or more of the non-adjacent CH$_2$ groups may independently be replaced by —O—, —CO—O—, —O—CO—, —NR$^1$—CO—, —CO—NR$^1$—, —NR$^1$—CO—O—, —O—CO—NR$^1$—, —CH═CH—, —C≡C—, —O—CO—O—, wherein R$^1$ and R$^2$ independently represent hydrogen or lower alkyl, wherein the broken line (i) symbolizes the possible linkages to the azo-binding group and wherein R represents hydrogen or lower alkyl;

E each independently represents hydrogen, lower alkyl, lower acyl or a polymerizable group selected from acryloyl or methacryloyl;

B represents a group of substructure II

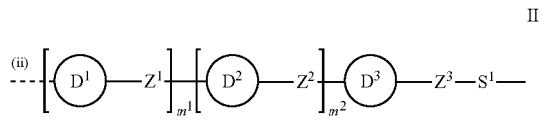

wherein the broken line (ii) symbolizes the linkage to said dichroic residue and wherein:

D$^1$, D$^2$, D$^3$ each independently represents an aromatic or alicyclic group, which is unsubstituted or substituted by fluorine, chlorine, cyano, nitro, or by a straight chain or branched alkyl residue having 1-10 carbon atoms, which alkyl residue is unsubstituted, mono- or poly-substituted by fluorine and wherein one or more of the non-adjacent CH$_2$ groups may independently be replaced by Q, whereby Q represents —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH═CH—, —C≡C—, —O—CO—O— and R has the meaning given above;

S$^1$ represents a single covalent bond or a spacer unit, such as a straight-chain or branched alkylene residue, which is unsubstituted, mono-substituted by cyano or halogeno, or poly-substituted by halogeno, having 1 to 24 carbon atoms, wherein one or more of the non-adjacent CH$_2$ groups may independently be replaced by Q, wherein Q has the meaning given above and wherein heteroatoms are not directly linked to each other;

Z$^1$, Z$^2$, Z$^3$ each independently represents a single covalent bond or a spacer unit, such as a straight-chain or branched alkylene residue, which is unsubstituted, mono-substituted by cyano or halogeno, or poly-substituted by halogeno, having 1 to 8 carbon atoms, wherein one or more of the non-adjacent CH$_2$ groups may independently be replaced by Q or —CR═C—CO—, wherein Q and R have the meaning given above;

m$^1$, m$^2$ independently are 0 or 1; and

P represents hydrogen, halogeno, cyano, nitro or a polymerizable group PG; and with the proviso that the compound of formula I comprises at least one polymerizable group.

It is understood that the term "dichroic residue" includes the pure chromophore system, to which ring systems, additional polymerizable groups and/or spacer units may be attached.

It is understood that the radical of formula a) includes also radical of formula a1)

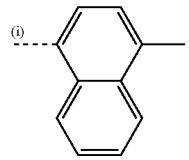

It is understood that the term "aromatic" includes optionally substituted carbocyclic and heterocyclic groups comprising five-, six- or ten-membered ring systems, such as furane, phenyl, pyridine, pyrimidine, naphthalene, or tetraline units.

It is understood that the term "alicyclic" includes non-aromatic carbocyclic or heterocyclic ring systems having 3 to 10 carbon atoms, such as cyclopropane, cyclobutane, cyclopentane, cyclopentene, cyclohexane, 1,3-dioxane, cyclohexene, cyclohexadiene and decaline.

It is understood that the phrase "straight chain or branched alkyl residue having 1-10 carbon atoms, which is unsubstituted, mono- or poly-substituted by fluorine, wherein one or more of the non-adjacent CH$_2$ groups may independently be replaced by Q" includes groups selected from the group comprising methyl, ethyl, propyl, isopropyl, butyl, isobutyl, sec-butyl, tert-butyl, pentyl, isopentyl, cyclopentyl, hexyl, cyclohexyl, heptyl, octyl, nonyl, decyl, 3-methylpentyl, allyl, but-3-en-1-yl, pent-4-en-1-yl, hex-5-en-1-yl, propynyl, butynyl, pentynyl, methoxy, ethoxy, propoxy, isopropoxy, butoxy, isobutoxy, sec-butoxy, tert-butoxy, pentyloxy, isopentyloxy, cyclopentyloxy, hexyloxy, cyclohexyloxy, heptyloxy, octyloxy, nonyloxy, 3-methylpentyloxy, allyloxy, but-3-enyloxy, pent-4-enyloxy, cylohexylmethoxy, cyclopentylmethoxy, methoxycarbonyl, ethoxycarbonyl, propoxycarbonyl, isopropoxycarbonyl, butoxycarbonyl, isobutoxycarbonyl, sec-butoxy-carbonyl, tert-butoxycarbonyl, pentyloxycarbonyl, isopentyloxycarbonyl, cyclopentyloxy-carbonyl, hexyloxycarbonyl, cyclohexyloxycarbonyl, octyloxycarbonyl, nonyloxycarbonyl, 3-methylpentyloxycarbonyl, allyloxycarbonyl, but-3-enyloxycarbonyl, pent-4-en-yl-oxy-carbonyl, cylohexylmethoxycarbonyl, cyclopentylmethoxycarbonyl, acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, pentylcarbonyloxy, isopentylcarbonyloxy, cyclopentylcarbonyloxy, hexylcarbonyloxy, cyclohexylcarbonyloxy, octylcarbonyloxy, nonylcarbonyloxy, 3-methylpentylcarbonyloxy, but-3-enyloxy, pent-4-enyloxy, acetyl, ethylcarbonyl, propylcarbonyl, isopropylcarbonyl, butylcarbonyl, isobutylcarbonyl, sec-butylcarbonyl, pentylcarbonyl, isopentylcarbonyl, cyclohexylcarbonyl, octylcarbonyl, nonylcarbonyl, methoxyacetoxy, 1-methoxy-2-propoxy, 3-methoxy-1-propoxy, 2-methoxyethoxy, 2-isopropoxyethoxy, 1-ethoxy-3-pentyloxy, 3-butynyloxy, 4-pentynyloxy, 5-chloropentynyl, 4-pentynecarbonyloxy, 6-propyloxyhexyl, 6-propyloxyhexyloxy, 2-fluoroethyl, trifluoromethyl, 2,2,2-trifluoroethyl, 1H,1H-pentadecafluorooctyl, 1H,1H,7H-dodecafluoroheptyl, 2-(perfluorooctyl)ethyl, 2-(perfluorobutyl)ethyl, 2-(perfluorohexyl)ethyl, 2-(perfluorodecyl)ethyl, perfluoropropyl, perfluorobutyl, perfluoroheptyl, perfluorooctyl, perfluorononyl. 1-fluoropropoxy, 1-fluoropentyloxy, 2-fluoropropoxy, 2,2-difluoropropoxy, 3-fluoropropoxy, 3,3-difluoropropoxy, 3,3,3-trifluoropropoxy, trifluoromethoxy, and the like.

It is understood that the term "lower alkyl" includes straight chain and branched hydrocarbon radicals having 1 to 6 carbon atoms, preferably 1 to 3 carbon atoms. Methyl, ethyl, propyl and isopropyl groups are especially preferred.

It is understood that the term "lower acyl" includes acetyl, propionyl, butyryl and isobytyryl groups. Acetyl is especially preferred.

The dichroic residue A may preferably be selected from the groups according to general formulae IIIa or IIIb:

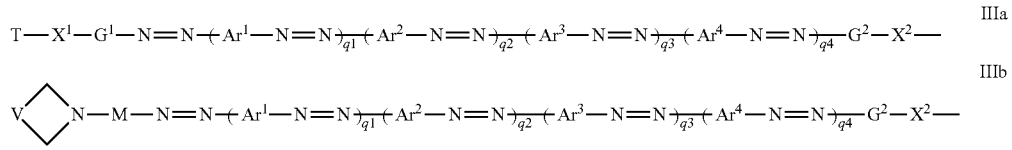

wherein
$Ar^1$, $Ar^2$, $Ar^3$, $Ar^4$ independently of each other are 1,4-phenylene, 1,4- or 1,5-naphthylene, which are unsubstituted, mono- or poly-substituted by fluorine, chlorine, hydroxy, —$NR^1R^2$ or by a straight chain or branched alkyl residue having 1-10 carbon atoms, which alkyl residue is unsubstituted, mono- or poly-substituted by fluorine, and wherein one or more of the non-adjacent $CH_2$ groups may independently be replaced by Q, wherein Q has the meaning given above and $R^1$ and $R^2$ independently represent hydrogen or lower alkyl;

$q^1$, $q^2$, $q^3$, $q^4$ independently are 0 or 1;

$G^1$, $G^2$ represent independently of each other 1,4-phenylene or a group of formula a) to f)

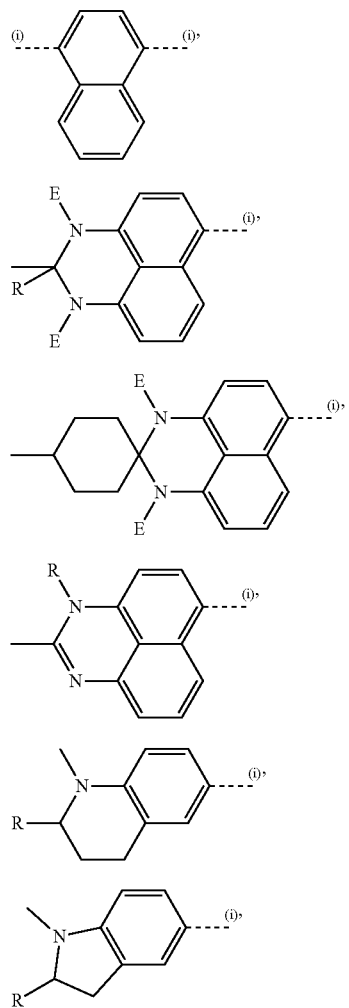

or branched alkyl residue having 1-10 carbon atoms, which alkyl residue is unsubstituted, mono- or poly-substituted by fluorine, and wherein one or more of the non-adjacent $CH_2$ groups may independently be replaced by —O—, —CO—O—, —O—CO—, —$NR^1$—CO—, —CO—$NR^1$—, —$NR^1$—CO—O—, —O—CO—$NR^1$—, —CH=CH—, —C≡C—, —O—CO—O—, wherein $R^1$ and $R^2$ independently represent hydrogen or lower alkyl and wherein the broken lines (i) symbolize the linkage to the azo-binding group and R, E have the meaning given above;

M represents 1,4-phenylene, 1,4-naphthylene which are unsubstituted, mono- or poly-substituted by fluorine, chlorine, hydroxy, —$NR^1R^2$ or by a straight chain or branched alkyl residue having 1-10 carbon atoms, which alkyl residue is unsubstituted, mono- or poly-substituted by fluorine, and wherein one or more of the non-adjacent $CH_2$ groups may independently be replaced by —O—, —CO—O—, —O—CO—, —$NR^1$—CO—, —CO—$NR^1$—, —$NR^1$—CO—O—, —O—CO—$NR^1$—, —CH=CH—, —C≡C—, —O—CO—O—, wherein $R^1$ and $R^2$ independently represent hydrogen or lower alkyl;

T represents a group of substructure IV

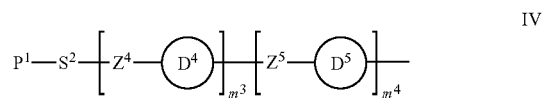

wherein
$P^1$ represents hydrogen, halogeno, cyano, nitro or a polymerizable group PG;

$S^2$ represents a single covalent bond or a spacer unit, such as a straight-chain or branched alkylene residue, which is unsubstituted, mono-substituted by cyano or halogeno, or poly-substituted by halogeno, having 1 to 24 carbon atoms, wherein one or more of the non-adjacent $CH_2$ groups may independently be replaced by Q, wherein Q has the meaning given above and such that heteroatoms are not directly linked to each other;

$Z^4$, $Z^5$ each independently represent a single covalent bond or a spacer unit, such as a straight-chain or branched alkylene residue, which is unsubstituted, mono-substituted by cyano or halogeno, or poly-substituted by halogeno, having 1 to 8 carbon atoms, wherein one or more of the non-adjacent $CH_2$ groups may independently be replaced by Q or —CR=C—CO—, wherein Q and R have the meaning given above; and $D^4$, $D^5$ each independently represent an aromatic or alicyclic group, which is unsubstituted or substituted by fluorine, chlorine, cyano, nitro, or by a straight chain or branched alkyl residue having 1-10 carbon atoms, which alkyl residue is unsubstituted, mono- or poly-substituted by fluorine, and wherein one or more of the non-adjacent $CH_2$ groups may independently be replaced by Q, wherein Q has the meaning given above;

$X^1$, $X^2$ represent independently of each other a single covalent bond or a spacer unit, such as a straight-chain or branched alkylene residue, which is unsubstituted, mono-substituted by cyano or halogeno, or poly-substituted by halogeno, having 1 to 8 carbon atoms, wherein one or more of the non-adjacent $CH_2$ groups may independently be replaced by —O—, —CO—, —CO—O—, —O—CO—, —Si(CH$_3$)$_2$—O—Si(CH$_3$)$_2$—, —NW—, —NW—CO—, —CO—NW—, —NW—CO—O—, —O—CO—NW—, —NW—CO—NW—, —CH=CH—, —C≡C—, —O—CO—O— or —CW=C—CO—, wherein W represents a group of substructure V $P^2$-Sp-  V wherein
$P^2$ represents hydrogen, cyano or a polymerizable group PG; and
Sp represents a single covalent bond or a spacer unit, such as a straight-chain or branched alkylene residue, which is unsubstituted, mono-substituted by cyano or halogeno, or poly-substituted by halogeno, having 1 to 5 carbon atoms, wherein one or more of the non-adjacent $CH_2$ groups may independently be replaced by —O—, —CO—, —CO—O—, —O—CO—, such that heteroatoms are not directly linked to each other;
V is selected from a group consisting of a single covalent bond, —CH$_2$—, —CH$_2$—CH$_2$—, —CH$_2$—CH$_2$—CH$_2$—, —CH$_2$—O—CH$_2$—, —CH$_2$—NT-CH$_2$—, —CH$_2$—(—CH$_2$—)$_2$—CH$_2$—, wherein T has the meaning given above;
with the proviso that if $G^1$, $G^2$ and M are optionally substituted 1,4-phenylene, at least one of $Ar^1$, $Ar^2$, $Ar^3$ or $Ar^4$ is optionally substituted 1,4-naphthylene.

Polymerizable groups PG are each independently preferably selected from the formulae $CH_2$=CY—, $CH_2$=CY—COO—, $CH_2$=CH—CO—NH—, $CH_2$=C(Ph)-CO—NH—, $CH_2$=CH—O—, $CH_2$=CH—OOC—, Ph-CH=CH—, $CH_2$=CH-Ph-, $CH_2$=CH-Ph-O—, $CH_2$=CH-Ph-OCO—, $R^3$-Ph-CH=CH—COO—, $R^2$—OOC—CH=CH-Ph-O—, N-maleinimidyl,

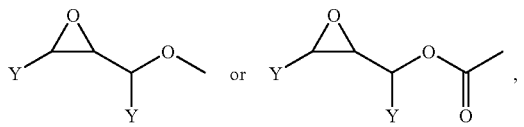

wherein Y each independently represents hydrogen, chloro or methyl, $R^2$ is hydrogen or lower alkyl, $R^3$ is hydrogen or lower alkoxy, Ph- is phenyl and -Ph- is 1,4-phenylene.

Particularly preferred groups PG include $CH_2$=CY—, $CH_2$=CY—COO—, $CH_2$=CH—O—, $CH_2$=CH—OOC—, $CH_2$=CH-Ph-O—, $CH_2$=CH-Ph-OCO—,

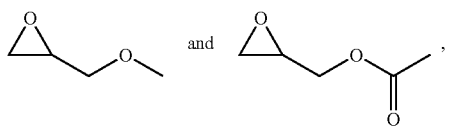

wherein Y is hydrogen or methyl.
Most preferred groups PG include $CH_2$=CY—COO—, $CH_2$=CH—O— and $CH_2$=CH—OOC—, wherein Y is hydrogen or methyl.

It is understood that the term "lower alkoxy" includes straight chain and branched hydrocarbonoxy radicals having 1 to 6 carbon atoms, preferably 1 to 3 carbon atoms. Methoxy, ethoxy, propoxy and isopropoxy groups are especially preferred.

Preferred rings $D^1$, $D^2$, $D^3$, $D^4$ and $D^5$ independently of each other are unsubstituted, saturated five- or six-membered alicyclic rings or six- or ten-membered aromatic rings, which are unsubstituted, mono- or poly-substituted by fluorine or chlorine or nitro or by a straight chain or branched alkyl residue having 1-6 carbon atoms, which alkyl residue is unsubstituted, mono- or poly-substituted by fluorine, and wherein one or more of the non-adjacent $CH_2$ groups may independently be replaced by —O—, —CO—O—, —O—CO—, —NR$^2$—CO—, —CO—NR$^2$—, —NR$^2$—CO—O—, —O—CO—NR$^2$—, —CH=CH—, —C≡C—, —O—CO—O—, wherein $R^2$ represents hydrogen or lower alkyl.

Particularly preferred rings $D^1$, $D^2$, $D^3$, $D^4$ and $D^5$ include unsubstituted cyclopentane-1,3-diyl, unsubstituted 1,3-dioxane-2,5-diyl, unsubstituted cyclohexane-1,4-diyl, unsubstituted naphtalene-2,6-diyl or 1,4-phenylene, which is unsubstituted, mono- or poly-substituted by fluorine or chlorine or by a straight-chain or branched alkyl residue having 1-3 carbon atoms, which alkyl residue is unsubstituted, mono- or poly-substituted by fluorine, and wherein one or more of the non-adjacent $CH_2$ groups may independently be replaced by —O—, —CO—O—, —O—CO—, —CH=CH—, —C≡C—.

Most preferred rings $D^1$, $D^2$, $D^3$, $D^4$ and $D^5$ are 1,4-phenylene, which is unsubstituted, mono- or poly-substituted by fluorine, chlorine, methyl, methoxy, acyl or —CO—O—CH$_3$.

Preferred "spacer units" $S^1$ and $S^2$ of the present invention include a single bond, or a straight-chain or branched alkylene grouping, such as —(CH$_2$)$_r$—, and also —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH$_2$)$_r$—NR$^2$—CO—(CH$_2$)$_s$—, —(CH$_2$)$_r$—NR$^2$—CO—O—(CH$_2$)$_s$—, —(CH$_2$)$_r$—(OCH$_2$CH$_2$)$_s$—(CH$_2$)$_t$— wherein r, s and t are each an integer from 1 to 20, the sum of r+s+t≤21, wherein $R^2$ represents hydrogen or lower alkyl, and which are attached to the dichroic residue and the polymerizable group, respectively, such that heteroatoms are not directly linked to each other.

Particularly preferred "spacer units" $S^1$ and $S^2$ include a single bond and a $C_{1-14}$ straight-chain alkylene group, especially ethylene, propylene, butylene, pentylene, hexylene, heptylene, octylene, nonylene, decylene, undecylene, or dodecylene.

Preferred "spacer units" Sp of the present invention include a single bond, or a straight-chain or branched alkylene grouping, such as a $C_{1-5}$ straight-chain alkylene group, and also —(CH$_2$)$_u$—O—(CH$_2$)$_v$—, —(CH$_2$)$_u$—CO—O—(CH$_2$)$_v$—, —(CH$_2$)$_u$—O—CO—(CH$_2$)$_v$—, wherein u and v are each an integer from 1 to 4, the sum of u+v≤4.

Particularly preferred "spacer units" Sp include a single bond and a $C_{1-5}$ straight-chain alkylene group, especially ethylene, propylene, butylene or pentylen.

Preferred $Z^1$, $Z^2$, $Z^3$, $Z^4$ and $Z^5$ groups include a single covalent bond or a straight-chain or branched alkylene residue, which is unsubstituted, mono-substituted or poly-substituted by fluoro, having 1 to 8 carbon atoms, wherein one or more of the non-adjacent $CH_2$ groups may independently be replaced by —O—, —CO—, —CO—O—, —O—CO—, —NR$^2$—CO—, —CO—NR$^2$—, —NR$^2$—CO—O—, —O—CO—NR$^2$—, —CH=CH—, —C≡C—, —O—CO—O—, —CR$^2$=C—CO—, wherein $R^2$ represents hydrogen or lower alkyl.

Particularly preferred $Z^1$, $Z^2$, $Z^3$, $Z^4$ and $Z^5$ groups include a single covalent bond or a straight-chain or branched alkylene residue, having 1 to 4 carbon atoms, wherein one or more of the non-adjacent $CH_2$ groups may independently be replaced by —O—, —CO—O—, —O—CO—, —CH=CH—, —C≡C—, —O—CO—O—, —$CR^2$=C—CO—, wherein $R^2$ represents hydrogen or lower alkyl.

It is most prefered that $Z^1$, $Z^2$, $Z^3$, $Z^4$ and $Z^5$ are each independently selected from a group consisting of a single covalent bond, —CO—O—, —O—CO—, —$CH_2$—O— or —O—$CH_2$—.

Preferred E groups include hydrogen, methyl, acetyl, acryloyl and methacryloyl.

Particularly preferred E groups include hydrogen, methyl and acetyl.

It is preferred that the sum of the integers $m^1+m^2$ is 0 or 1.

It is preferred that the sum of the integers $q^1+q^2+q^3+q^4$ is 0, 1, 2.

It is preferred that $X^1$ and $X^2$ when linked to 1,4-phenylene or 1,4-naphthylene each independently represent a single covalent bond, —CO—O—, —O—CO—, —$CH_2$—O—, —O—$CH_2$—, —NW—, —$CH_2$—NW—, —NW—$CH_2$—, —N=CR—, —CR=N—, —NW—CO— or —CO—NW—, and more preferably —CO—O—, —O—CO—, —$CH_2$—O—, —O—$CH_2$—, —NR— or —$CH_2$—NR—, —NR—$CH_2$—, —NR—CO— or —CO—NR—, wherein W and R have the meaning given above.

It is preferred that $X^1$ and $X^2$ when linked to a group of formula b), c) or d) each independently represent a single covalent bond, —$CH_2$—$CH_2$—, —O—$CH_2$ . . . (iv), —NW—$CH_2$ . . . (iv), —CH=CH—, —O—$CH_2$—$CH_2$—$CH_2$ . . . (iv) or —NW—$CH_2$—$CH_2$—$CH_2$ . . . (iv), more preferably a single covalent bond, —$CH_2$—$CH_2$—, —O—$CH_2$ . . . (iv), —NW—$CH_2$ . . . (iv), —CH=CH—, and most preferably a single covalent bond or —$CH_2$—$CH_2$—, wherein W has the meaning given above and the broken lines (iv) symbolize the linkage to the groups of formula b), c) or d).

It is preferred that $X^1$ and $X^2$ when linked to a group of formula e) or f) each independently represent —$CH_2$—, —CO—, —$CH_2$—$CH_2$—$CH_2$—, —O—$CH_2$—$CH_2$ . . . (iv) —NW—$CH_2$—$CH_2$ . . . (iv), —CH=CH—$CH_2$ . . . (iv), —OCO—$CH_2$ . . . (iv) or —$CH_2$—OCO . . . (iv), and more preferably —$CH_2$— or —CO—, wherein W has the meaning given above and the broken lines (iv) symbolize the linkage to the groups of formula e) or f).

It is preferred that V is selected from a group consisting of —$CH_2$—$CH_2$—, —$CH_2$—$CH_2$—$CH_2$— or —$CH_2$—O—$CH_2$—.

It is preferred that M is 1,4-phenylene, which is unsubstituted, monosubstituted by chlorine or —$CH_3$, with the proviso that at least one of $Ar^1$, $Ar^2$, $Ar^3$ or $Ar^4$ is optionally substituted 1,4-naphthylene.

It is especially preferred that M is unsubstituted 1,4-phenylene, with the proviso that at least one of $Ar^1$, $Ar^2$, $Ar^3$ or $Ar^4$ is 1,4-naphthylene.

It is preferred that $Ar^1$, $Ar^2$, $Ar^3$ and $Ar^4$ independently of each other are 1,4-phenylene or 1,4-naphthylene, which are unsubstituted, mono- or disubstituted by fluorine, chlorine, —$OCH_3$ or —$CH_3$, with the proviso that at least one of $Ar^1$, $Ar^2$, $Ar^3$ or $Ar^4$ is optionally substituted 1,4-naphthylene if $G^1$ and $G^2$ are optionally substituted 1,4-phenylene.

It is especially preferred that $Ar^1$, $Ar^2$, $Ar^3$ and $Ar^4$ independently of each other are 1,4-phenylene, which is unsubstituted, mono- or disubstituted by chlorine or —$CH_3$ or unsubstituted 1,4-naphthylene, with the proviso that at least one of $Ar^1$, $Ar^2$, $Ar^3$ or $Ar^4$ is unsubstituted 1,4-naphthylene if $G^1$ and $G^2$ are optionally substituted 1,4-phenylene.

It is preferred that $G^1$ and $G^2$ independently of each other are 1,4-phenylene or 1,4-naphthylene, which are unsubstituted, mono- or disubstituted by fluorine, chlorine, —$OCH_3$ or —$CH_3$, preferably 1,4-phenylene, which is unsubstituted, mono- or disubstituted by chlorine or —$CH_3$ or unsubstituted 1,4-naphthylene; or a group of formula b), c) and d), preferably a group of formula b) and c), which are unsubstituted and wherein the broken lines (i) symbolize the linkage to the azo-binding group and R, E have the meaning given above

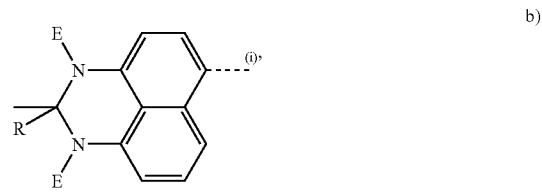

b)

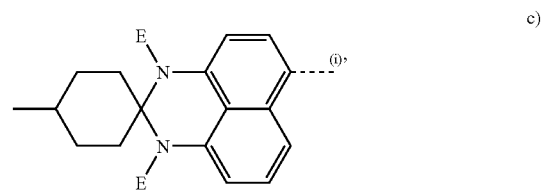

c)

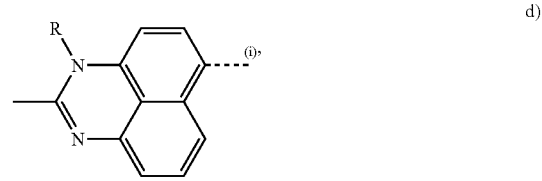

d)

or a group of formula e) and f), which is unsubstituted and wherein the broken lines (i) symbolize the linkage to the azo-binding group and R represents hydrogen or lower alkyl

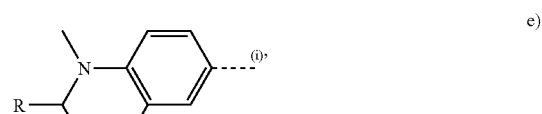

e)

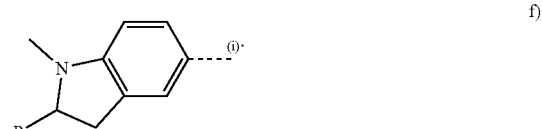

f)

It is especially preferred that $G^1$ and $G^2$ independently of each other are 1,4-phenylene or 1,4-naphthylene, which are unsubstituted, mono- or disubstituted by fluorine, chlorine, —$OCH_3$ or —$CH_3$, preferably 1,4-phenylene, which is unsubstituted, mono- or disubstituted by chlorine or —$CH_3$ or unsubstituted 1,4-naphthylene; or a group of formula b), c) and d), preferably a group of formula b) and c), which are unsubstituted and wherein the broken lines (i) symbolize the linkage to the azo-binding group and R, E have the meaning given above

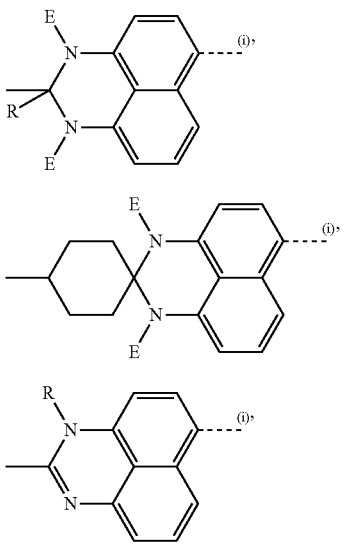

A further preferred embodiment of the present invention are dyes according to the general formula I:

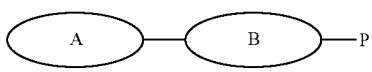

wherein
A is a dichroic residue of general formula IIIa, $$T-X^1-G^1-N=N-(-Ar^1-N=N-)_{q1}-(-Ar^2-N=N-)_{q2}-(-Ar^3-N=N-)_{q3}-(-Ar^4-N=N-)_{q4}-G^2-X^2 \quad \text{IIIa}$$

wherein
$G^1$ and $G^2$ independently of each other represent 1,4-phenylene, which is unsubstituted, mono- or disubstituted by chlorine or $-CH_3$, or unsubstituted 1,4-naphthylene; or a group of formula b) or c)

b)
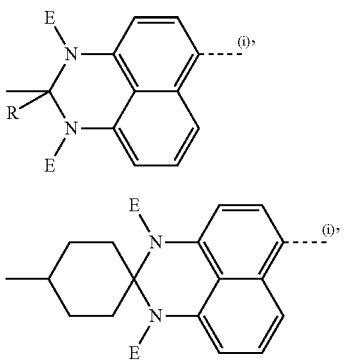

c)

wherein the broken lines (i) symbolize the linkage to the azo-binding group; and wherein
E independently represents hydrogen, methyl and acetyl;
R independently represents hydrogen, methyl, ethyl, propyl and isopropyl;
$X^1$ and $X^2$ independently of each other represent a covalent bond, $CH_2-CH_2-$, $-CO-O-$, $-O-CO-$, $-CH_2-O-$, $-O-CH_2-$, $-NR-$ or $-CH_2-NR-$, $-NR-CH_2-$, $-NR-CO-$ or $-CO-NR-$, wherein R has the meaning given above;
B represents a group of substructure XXIII

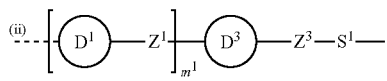

wherein the broken line (ii) symbolizes the linkage to said dichroic residue;
and wherein
$Ar^1$, $Ar^2$, $Ar^3$, $Ar^4$ are independently of each other 1,4-phenylene, which is unsubstituted, mono- or disubstituted by chlorine or $-CH_3$, or unsubstituted 1,4-naphthylene, with the proviso that if $G^1$ and $G^2$ are optionally substituted 1,4-phenylen at least one of $Ar^1$, $Ar^2$, $Ar^3$ or $Ar^4$ is unsubstituted 1,4-naphthylene;
$q^1, q^2, q^3, q^4$ independently are 0 or 1, with the proviso that the sum of the integers $q^1+q^2+q^3+q^4+0$, 1, or 2;
P and $P^1$ independently of each other represent hydrogen, halogeno, cyano, nitro or a polymerizable group PG, wherein PG includes $CH_2=CY-COO-$, $CH_2=CH-O-$ and $CH_2=CH-OOC-$, wherein Y is hydrogen or methyl;
$D^1$, $D^3$, $D^4$ and $D^5$ independently of each other represent 1,4-phenylene, which is unsubstituted, mono- or poly-substituted by fluorine, chlorine, methyl, methoxy, acyl or $-CO-O-CH_3$;
$Z^1$, $Z^3$, $Z^4$ and $Z^5$ independently of each other represent selected from a group consisting of a single covalent bond, $-CO-O-$, $-O-CO-$, $-CH_2-O-$ or $-O-CH_2-$;
$S^1$ and $S^2$ represent independently of each other a single bond, ethylene, propylene, butylene, pentylene, hexylene, heptylene, octylene, nonylene, decylene, undecylene, or dodecylene and
$m^1$, $m^3$, $m^4$ are independently of each other 0 or 1.

It is especially preferred that if $G^1$ and $G^2$ independently of each other represent a group of formula b) or c), $X^1$ and $X^2$ independently of each other represent a covalent bond or $CH_2-CH_2-$ such that
T-X1-G1- preferably represents a group of substructures VI-IX

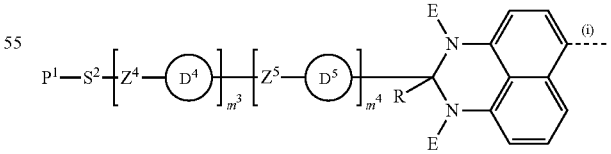

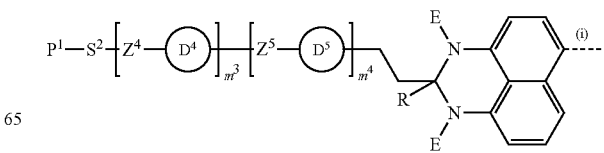

-continued

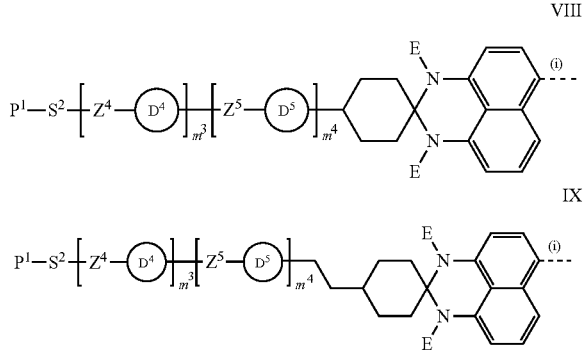

and
-G²-X2- preferably represents a group of substructures X-XIII

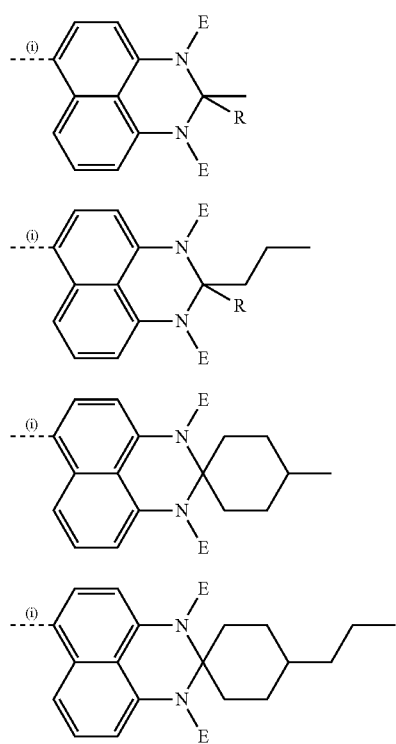

wherein the broken lines (i) symbolize the linkage to the azo-binding group;

The dichroic azo dyes of the invention may readily be prepared using methods well known to the person skilled in the art, such as those documented in Houben-Weyl, *Methoden der Organischen Chemie*, Thieme-Verlag, Stuttgart.

For the preparation of dichroic polymer networks and gels, such as unstructured and structured polarizers, the dyes according to the present invention may be used singly. Alternatively, two or more of the dyes may also be used in combination. The number of dyes of formula I present in the prevailing host may depend mainly on the spectral working range of the polymer and on the solubility of the dyes. Colored polarizers, which are absorbing in a selective spectral range, may preferably be achieved by the presence of one or two dyes in the host. Black polarizers, selectively absorbing in the whole visible range, may preferably be achieved by the presence of three or more dyes.

In general, the total content of the dichroic dyes of formula I according to the invention in the respective host may depend on different factors such as solubility in the host and absorption ability (extinction) of the dyes involved. Preferred dye concentrations may be in the range of 0.01 to 50% wt, more preferably from 0.01 to 20% wt, most preferably from 0.01 to 10% wt.

It is also feasible to mix a dichroic dye of this invention with another dichroic or non-dichroic dye to use the resultant mixture as a dichroic dye of a desired color hue. No limitation is imposed in this concern.

The mesogenic, polymerizable mixtures containing at least one dichroic dye of this invention comprise at feast one polymerizable liquid crystal (LCP). Polymerizable liquid crystals are well known to the skilled person and are described e.g. in EP 0331233, WO 95/24454, U.S. Pat. Nos. 5,567,349, 5,650, 534, WO 00/04110, WO 00/07975, WO 00/48985, WO 00/55110 and WO 00/63154. For adjustment of mesomorphic properties and suppression of crystallization, mixtures of two or more LCP components may also be used. The addition of isotropic compounds comprising two or more polymerizable groups, so called crosslinkers, may also be possible. Furthermore well known additives such as e.g. phenol derivatives for stabilization and photoinitiators such as e.g. Irgacure® may also be present in the mixture.

Preferred mixtures of the invention consequently comprise at least one dichroic dye according to the general formula I and at least one polymerizable liquid crystal and optionally additives, such as crosslinkers, stabilizers and photoinitiators.

Particularly preferred are mixtures comprising one to four dichroic dyes of formula I and at least one polymerizable liquid crystal compound comprising two polymerizable groups and optionally additives such as crosslinkers, stabilizers and photoinitiators.

The dichroic azo dyes according to the invention are also suitable for the creation of dyed cholesteric layers.

When added to a cholesteric mixture the polymerizable dichroic azo dyes according to the invention can contribute to the enhancement of special color effects, and therefore their further use in the formation of dyed cholesteric devices is an additional and valuable asset.

Further preferred mixtures of the invention therefore comprise at least one dichroic dye according to the general formula I and either at least one chiral polymerizable liquid crystal compound and optionally additives, such as crosslinkers, stabilizers and photoinitiators, or at least one polymerizable liquid crystal compound and at least one chiral component inducing the cholesteric phase and optionally additives, such as crosslinkers, stabilizers and photoinitiators, in order to produce dyed cholesteric mixtures.

The polymerizable liquid crystalline mixtures according to the present invention may further be formed into dichroic polymer networks and gels. Dichroic polymer networks (hereinafter called dichroic liquid crystalline polymer films (LCP films)) have been found to be of particular use and, thus, a further aspect the invention provides dichroic films formed from mixtures according to the present invention.

Such LCP films may readily be prepared by UV or thermal polymerization of the mixtures of the present invention. A film comprising a mixture according to the present invention is formed on a substrate, for example, by first preparing a solution of a mixture, which is subsequently applied to a support by different coating techniques, such as spincoating, miniscuscoating, wirecoating, slotcoating, offsetprinting, flexoprinting, gravureprinting and inkjet-printing. After evaporation of the solvent, the obtained film is polymerized using UV light to give a cross-linked dichroic liquid crystal film of preferably 0.5 to 5 micrometer thickness. If required, such films may further be coated with other layers, such as e.g. protective layers for protection against oxygen, UV irradiation or mechanical stress. Such films may be used in the manufacture of devices such as polarizers or optical filters.

Examples of substrates used in the preparation of dichroic LCP films may include transparent substrates, such as glass or plastic, including an orientation layer, which is able to induce a uniform orientation to the mixture. Such orientation layers may include rubbed polyimide, or polyamide or preferably layers of photo-orientable materials. A well-suited kind of photo-orientable orientation layers are Linearly Photopolymerizable Polymers (LPP), also sometimes referred to as Photooriented Polymer Networks (PPN). Backgrounds and manufacturing of such orientation layers are disclosed in, for example, U.S. Pat. Nos. 5,389,698, 838,407, 5,602,661, 6,160,597, 6,144,428, 6,300,991 all of the applicant. Using LPP layers, segments (pixels) of locally varying orientation may be formed. Thus, not only uniformly aligned dichroic LCP layers but also structured complex orientation patterns within the dichroic LCP layers may be produced. Furthermore multilayer systems formed from stacks of alternating LPP and LCP layers, wherein at least one of the LCP layers is a dichroic LCP layer are feasible. Such layers or stacks of layers may additionally be covered by other well known functional layers, such as, e.g. protecting layers against oxygen or humidity or layers for protection against ultraviolet radiation.

Recently it has been shown, e.g. in WO 99/64924, that photo-orienting materials like LPPs may also be able to orient liquid crystals, such as LCPs, if they are admixed to the mixture to be oriented prior to illumination with polarized light. In this way, orientation layers and LCP layers need not be formed separately. Thus, an analogous preparation of a dichroic LCP film using an inventive mixture, which in addition contains a photo-orientable material, is also be possible.

The dichroic mixtures and films of the present invention may be used to prepare electro-optical and optical devices including security devices. A further aspect of the invention therefore provides an electro-optical or optical component or a security device comprising a dichroic liquid crystalline polymer film formed from a mixture of the invention. Examples of optical or electro-optical components may include structured or unstructured optical filters, polarizers, etc. Security or authentication devices may for instance be used to safeguard banknotes, credit cards, securities, identity cards and the like against forgery and copying.

In another aspect, the invention provides an orientation layer containing at least one dichroic dye according to formula I. Such orientation layers, which are able to induce a uniform orientation to a liquid crystalline mixture, may include rubbed polyimide, or polyamide or preferably layers of photo-orientable materials. Such dyed orientation layers can be used in the manufacture of optical or electro-optical components, which may include structured or unstructured optical filters, polarizers or elements of security devices.

The following non-limiting examples further describe the present invention. Variations on these falling within the scope of the invention will be apparent to a person skilled in the art.

Following abbreviations are used:
DMAP 4-Dimethylaminopyridine
DMF N,N-Dimethylformamide
THF Tetrahydrofuran

EXAMPLE 1

Preparation of 6-{4-[({4-[(E)-(4-{(E)-[4-(diethylamino)phenyl]diazenyl}phenyl)-diazenyl]-1-naphthyl}amino)carbonyl]phenoxy}hexyl 2-methylacrylate

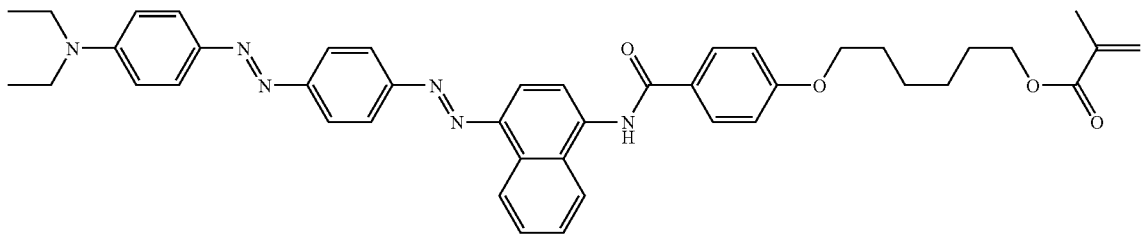

1) N-{4-[(E)-(4-Aminophenyl)diazenyl]phenyl}-N,N-diethylamine

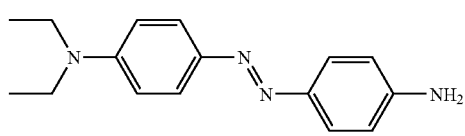

56.7 g of N,N-diethyl-4-[(E)-(4-nitrophenyl)diazenyl] aniline (0.19 M) were slurried in 270 ml of methanol at 60° C. and a solution of 147 g of sodium hydrogen sulfide-1-hydrate (1.98 M) in 150 ml of water was added cautiously. Upon addition, the former thick suspension became more liquid and the reaction mixture boiled heavily. When addition was complete, it was stirred for 0.5 h at 60° C., then cooled to room temperature and 400 ml of ice-water were added. The resulting suspension was stirred for 10 min., thereafter the solids were filtered off and washed several times with warm water, giving almost pure N-{4-[(E)-(4-aminophenyl)diazenyl]phenyl}-N,N-diethylamine as red-orange solid, used without drying in the next step.

2) 4-[(E)-(4-{(E)-[4-(Diethylamino)phenyl]diazenyl}phenyl)diazenyl]naphthalen-1-amine

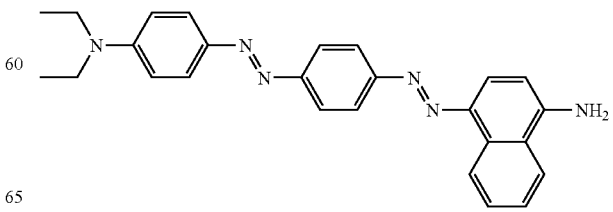

The still wet solid of N-{4-[(E)-(4-aminophenyl)diazenyl]phenyl}-N,N-diethylamine was slurried in 50 ml of hydrochloric acid 37% and 110 ml of water for 0.5 h at 15-20° C., then it was cooled to 0-5° C. and a solution of 10.7 g of sodium nitrite (0.155 M) in 50 ml of water was added. During the addition, ice was added to the reaction mixture to maintain the temperature between 0-5° C. When the addition was complete, the mixture was stirred for 0.5 h at this temperature, then the excess of nitrite was destroyed by addition of ca. 1 g of amidosulfonic acid and the mixture stirred for further 5 min. The reaction mixture was filtered, the cake washed with water and the red filtrate was added to a mechanically stirred, cooled (ca. 15° C.) solution of 22.2 g of naphthylamine (0.155 M) in 150 ml of ethanol. When addition was complete, the coupling mixture was stirred for 1 h at 20-30° C., then it was made alkaline by addition of ca. 40 ml of ammonia solution 26%. The dark precipitate was filtered off, washed several times with water, followed by 200 ml of methanol twice and dried. The resulting dark powder was boiled for 1 h in 300 ml of toluene and 300 ml of hexanes, the formed suspension cooled to 0° C. and the solid was filtered off, washed twice with in all 250 ml of hexanes (150 ml and 100 ml) and dried to give 61.02 g (0.144 M, 76% over both steps) of 4-[(E)-(4-{(E)-[4-(diethylamino)phenyl]diazenyl}phenyl)-diazenyl]naphthalen-1-amine as red powder.

3) 6-{4-[({4-[(E)-(4-{(E)-[4-(Diethylamino)phenyl]diazenyl}phenyl)diazenyl]-1-naphthyl}amino)carbonyl]phenoxy}hexyl 2-methylacrylate

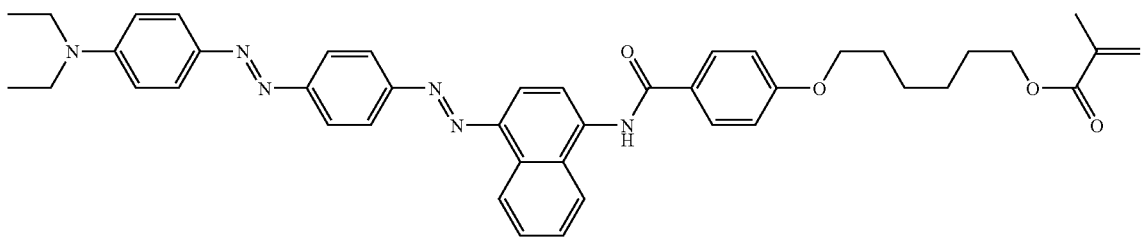

2.11 g of 4-[(E)-(4-{(E)-[4-(diethylamino)phenyl]diazenyl}phenyl)-diazenyl]-naphthalen-1-amine (5.0 mM) were dissolved in 10 ml of pyridine at 5° C. and a solution of 1.70 g of 4-{([6-(methacryloyloxy)hexyl]oxy}benzoic acid chloride (5.25 mM) in 2 ml of pyridine was added dropwise. When addition was complete, it was stirred for 0.5 h at room temperature. To the reaction mixture were added 100 ml of dichloromethane and 10 g of celite filter aid. The resulting suspension was stirred for 15 min., filtered, the cake was washed with dichloromethane and the filtrate was reduced to approx. 50 ml. To this mixture was then added 200 ml of methanol dropwise at 0° C. The precipitated crystals were filtered off, washed with cooled methanol and dried to give 3.23 g (4.54 mM, 93%) of 6-{4-[({4-[(E)-(4-{(E)-[4-(diethylamino)phenyl]diazenyl}phenyl)-diazenyl]-1-naphthyl}amino)carbonyl]-phenoxy}-hexyl 2-methylacrylate as red powder; $\lambda_{max}$=504 nm, $\epsilon$=45000 (THF). For total purification, the dye might be flash chromatographed on silica gel.

EXAMPLE 2

Preparation of 4-pentylphenyl 4-[(E)-(4-{(E)-[4-({4-[(4-{[6-(methacryloyloxy)hexyl]-oxy}benzoyl)oxy]benzyl}amino)-1-naphthyl]diazenyl}-1-naphthyl)diazenyl]-3-methylbenzoate 1) 4-Pentylphenyl 3-methyl-4-nitrobenzoate

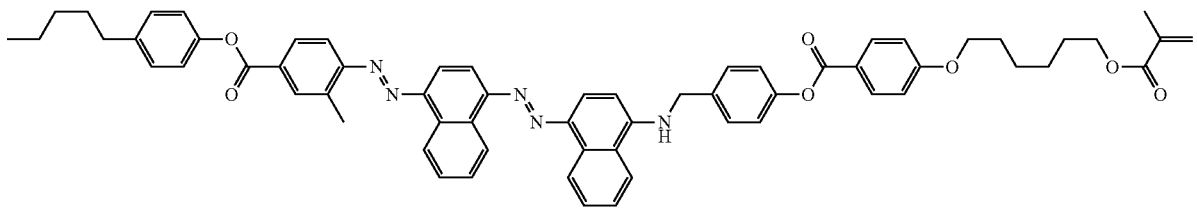

9.50 g of 3-methyl-4-nitrobenzoic acid (52.5 mM) were dissolved in 400 ml of THF and 53.1 g of triethylamine (525.0 mM). The solution was cooled to −30° C. and 6.01 g of methansulfochloride (52.5 mM) were added. The mixture was stirred for 1 h at this temperature, then a solution of 8.21 g of 4-pentylphenol (50.0 mM) in 20 ml of THF was added, followed by 100 mg of DMAP. The reaction mixture was stirred for 1 h at −30° C. and was allowed to warm to room temperature while stirred overnight. The next day, the mixture was filtered through a pad of celite filter aid, evaporated to dryness. The residue was flash chromatographed on silica gel using cyclohexane/ethyl acetate: 1/1 as eluent to afford 4-pentylphenyl 3-methyl-4-nitrobenzoate as a yellow oil. Yield: 16.2 g (49.5 mM, 99%).

2) 4-Pentylphenyl 4-amino-3-methylbenzoate

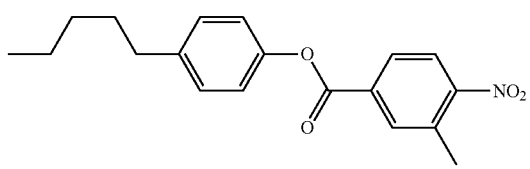

16.2 g of 4-pentylphenyl 3-methyl-4-nitrobenzoate (49.5 mM) were dissolved in 250 ml of ethyl acetate and 1.5 g of Pd/C (10%) were added. This mixture was hydrogenated at normal pressure. When the theoretical amount of hydrogen was consumed, it was filtered through a pad of celite filter aid and evaporated to dryness to give 14.5 g (49.0 mM, 98%) of 4-pentylphenyl 4-amino-3-methylbenzoate as beige crystals.

3) 4-Pentylphenyl 4-[(E)-(4-amino-1-naphthyl)diazenyl]-3-methylbenzoate

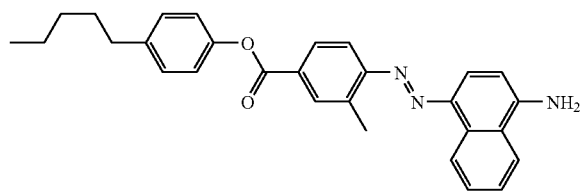

5.95 g of 4-pentylphenyl 4-amino-3-methylbenzoate (20.0 mM) were suspended in 100 ml of DMF and 20 ml of hydrochloric acid 37%. The suspension was cooled to 5° C. and a solution of 1.40 g of sodium nitrite (20.0 mM) in 5 ml of water was added dropwise. When the addition was complete, the mixture was stirred for 0.5 h at room temperature, then it was cooled to 5° C. and the excess of nitrite was destroyed by addition of ca. 0.1 g of amidosulfonic acid and the mixture stirred for further 5 min. The reaction mixture was poured onto 500 ml of icewater. To this solution was added a solution of 2.86 g of 1-naphthylamine (20.0 mM) in 10 ml of DMF. When addition was complete, the coupling mixture was stirred for 0.5 h at 5° C., then it was made alkaline by addition of ca. 20 ml of ammonia solution 26%. The dark precipitate was filtered off, washed several times with water and dried. The resulting red-brown powder was boiled for 1 h in 150 ml of methanol, the formed suspension was cooled to room temperature and the solid was filtered off, washed with methanol and dried to give 7.19 g (15.9 mM, 80%) of 4-pentylphenyl 4-[(E)-(4-amino-1-naphthyl)diazenyl]-3-methylbenzoate as red crystals.

4) 4-[(1-Naphthylamino)methyl]phenol

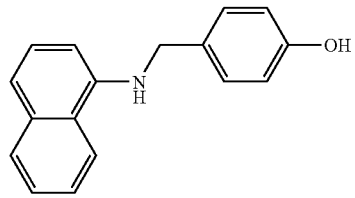

28.64 g of 1-naphthylamine (0.20 mM) and 24.42 g of 4-hydroxybenzaldehyd (0.20 M) were dissolved in 200 ml of iso-propanol and a catalytical amount of p-toluenesulfonic acid (approx 0.1 g) was added. The mixture was stirred at room temperature overnight. The resulting suspension was then cooled to 5° C. and 7.57 g of sodium borohydride (0.20 M) were added portionwise at this temperature. It was stirred overnight, allowing the mixture to warm to room temperature. The next day, approx. 12 ml of glacial acetic acid were added dropwise, followed by 400 ml of water. The resulting solid was filtered off, washed with water and dried to give 46.8 g of beige crystals. As the reaction was not complete, these 46.8 g of beige crystals were dissolved in 100 ml of THF and 300 ml of MeOH. The solution was cooled to 5° C. and additional 7.10 g of sodium borohydride (0.187 M) were added in small portions. When addition was complete, it was stirred for 0.5 h at 10° C., then treated with approx. 12 ml of glacial acetic acid. Approximately ⅔ of the solvent were evaporated off and the residue was diluted with 300 ml of water. The resulting solid was filtered off, washed with water and dried to give 45.74 g (0.184 M, 92%) of pure 4-[(1-naphthylamino)methyl]phenol as beige crystals.

5) 4-Pentylphenyl 4-{(E)-[4-((E)-{4-[(4-hydroxybenzyl)amino]-1-naphthyl}-diazenyl)-1-naphthyl]diazenyl}-3-methylbenzoate

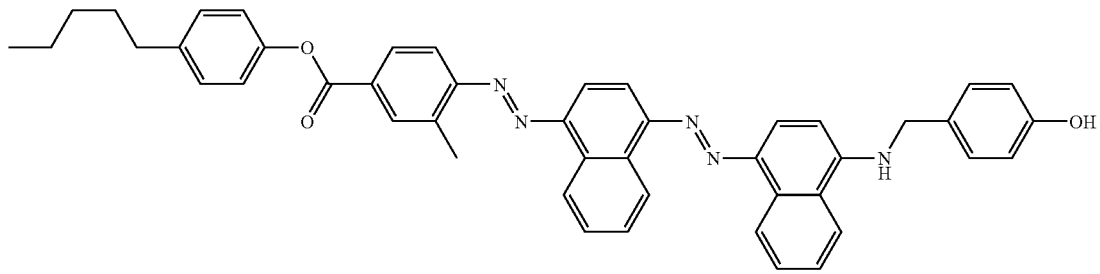

2.26 g of 4-pentylphenyl 4-[(E)-(4-amino-1-naphthyl)diazenyl]-3-methylbenzoate (5.00 mM) were dissolved in 20 ml of pyridine and 120 ml of glacial acetic acid. The solution was cooled to 3° C. and a solution of 0.35 g of sodium nitrite (5.00 mM) in 3 ml of water was added dropwise. When the addition was complete, the mixture was stirred for 0.5 h at 3° C., then the excess of nitrite was destroyed by addition of ca. 0.1 g of amidosulfonic acid and the mixture stirred for further 5 min. To this solution was added a solution of 1.25 g of 4-[(1-naphthylamino)methyl]phenol (5.00 mM) in 5 ml of DMF at 3° C. When addition was complete, the coupling mixture was stirred for 0.5 h at 3° C., then 1 h at room temperature. The reaction mixture was poured onto icewater and the dark precipitate was filtered off, washed several times with water and dried to give 3.45 g (4.85 mM, 97%) of 4-pentylphenyl 4-{(E)-[4-((E)-{4-[(4-hydroxybenzyl)-amino]1-naphthyl}-diazenyl)-1-naphthyl]diazenyl}-3-methylbenzoate as dark crystals.

6) 4-Pentylphenyl 4-[(E)-(4-{(E)-[4-({4-[(4-{[6-(methacryloyloxy)hexyl]oxy}-benzoyl)oxy]benzyl}amino)-1-naphthyl]diazenyl}-1-naphthyl)diazenyl]-3-methylbenzoate

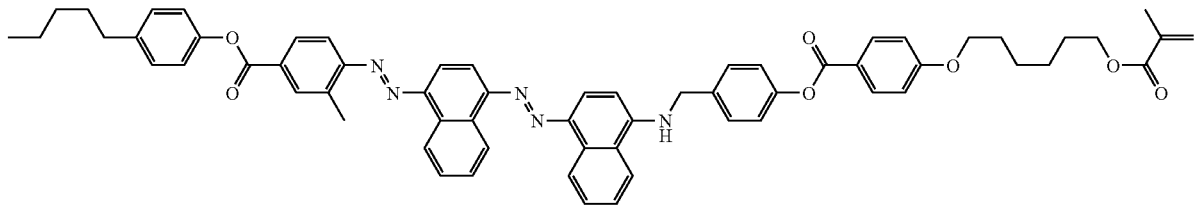

0.68 g of 4-{[6-(methacryloyloxy)hexyl]oxy}benzoic acid (2.20 mM) were dissolved in 20 ml of THF and 2.22 g of triethylamine (22.00 mM). The solution was cooled to −30° C. and 0.25 ml of methansulfochloride (2.20 mM) were added. The mixture was stirred for 1 h at this temperature, then 1.42 g of 4-pentylphenyl 4-{(E)-[4-((E)-{4-[(4-hydroxybenzyl)-amino]1-naphthyl}-diazenyl)-1-naphthyl]diazenyl}-3-methylbenzoate (2.00 mM) were added at once, followed by 50 mg of DMAP. The reaction mixture was stirred for 1 h at −30° C. and was allowed to warm to room temperature while stirred overnight. The next day, 10 g of celite filter aid were added and the resulting suspension was stirred for 15 min., filtered, the cake was washed with THF and the filtrate was evaporated to dryness. The residue was dissolved in 10 ml of dichloromethane and to this solution was then added approx. 30 ml of methanol dropwise at 0° C. The precipitated crystals were filtered off, washed with cooled methanol and dried to give 1.60 g (1.60 mM, 80%) of 4-pentylphenyl 4-[(E)-(4-{(E)-[4-({4-[(4-{[6-(methacryloyloxy)hexyl]oxy}benzoyl)oxy]benzyl}amino)-1-naphthyl]-diazenyl}-1-naphthyl)diazenyl]-3-methylbenzoate as dark crystals; $\lambda_{max}$=571 nm, $\epsilon$=35000 (THF). For total purification, the dye might be flash chromatographed on silica gel.

EXAMPLE 3

Preparation of 4-{6-[(E)-(4-{(E)-[4-(dimethylamino)phenyl]diazenyl}phenyl)-diazenyl]-2,3-dihydro-1H-perimidin-2-yl}phenyl 4-{[6-(acryloyloxy)hexyl]oxy}-benzoate

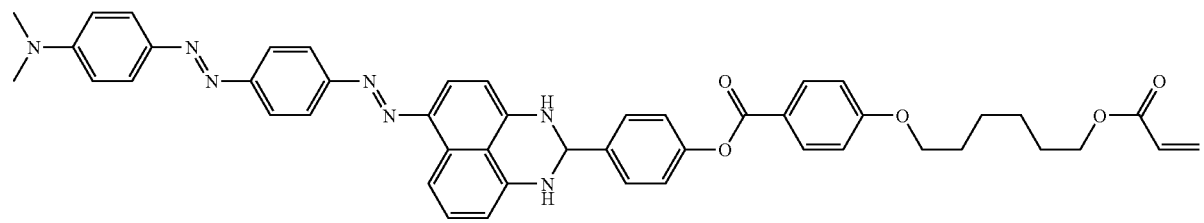

1) 4-{6-[(E)-(4-{(E)-[4-(dimethylamino)phenyl]diazenyl}phenyl)diazenyl]-2,3-dihydro-1H-perimidin-2-yl}phenol

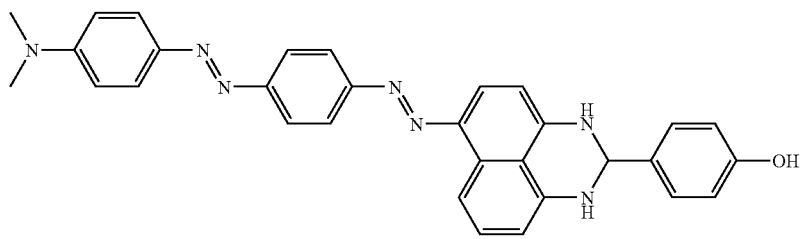

A mixture comprising 1.58 g of 1,8-diaminonaphtalene (10.00 mM), 1.22 g of 4-hydroxybenzaldehyde (10.00 mM) and 20 ml of ethanol was stirred and refluxed for 1 h.

Meanwhile, 4-N,N-dimethylazodianiline was diazotized as described in the following: 2.40 g of 4-N,N-Dimethylazodianiline (10.00 mM) were dissolved in 10 ml of DMF. 6 ml of HCl 37% and 15 ml of water were added and the mixture was cooled to 0° C. and treated dropwise with a solution of 0.69 g of sodium nitrite (10.00 mM) in 5 ml of water. When addition was complete, the obtained dark mixture was further stirred at 0° C. for 2 h, then it was ready for the coupling reaction.

For the coupling reaction, the refluxed mixture containing 1,8-diaminonaphtalene and 4-hydroxybenzaldehyde was cooled to 0° C. and the diazo-solution was added drop-wise. After complete addition (within 30 min), the reaction mixture was stirred for further 30 min. between 0° and 10° C., then cooled to 0° C. At this temperature a solution of 7.0 g of potassium acetate in 25 ml of water was added dropwise. After complete addition (within 30 min) the reaction mixture was further stirred at 0° C. for 1 h and then at room temperature for 30 min. The occurred dark precipitate was filtered off, washed with water (3×100 ml) and dried to give 4.90 g (9.60 mM, 96%) of 4-{6-[(E)-(4-{(E)-[4-(dimethylamino)phenyl] diazenyl}phenyl)diazenyl]-2,3-dihydro-1H-perimidin-2-yl}-phenol as a dark powder.

2) 4-{6-[(E)-(4-{(E)-[4-(dimethylamino)phenyl] diazenyl}phenyl)diazenyl]-2,3-dihydro-1H-perimidin-2-yl}phenyl 4-{[6-(acryloyloxy)hexyl] oxy}benzoate

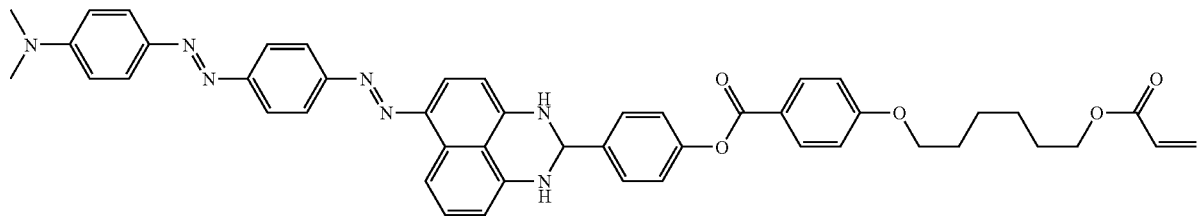

To an ice cooled solution of 1.47 g of 4-{[6-(acryloyloxy) hexyl]oxy}benzoic acid (5.00 mM) and 0.24 g of DMAP (2.00 mM) in 20 ml of dichloromethane, was added a solution of 1.03 g of DCC (5.00 mM) in 10 ml of dichloromethane dropwise. After complete addition (within 15 min) stirring was continued at 0° C. for further 90 min., then 2.57 g of 4-{6-[(E)-(4-{(E)-[4-(dimethylamino)phenyl] diazenyl}phenyl)-diazenyl]-2,3-dihydro-1H-perimidin-2-yl}-phenol (5.00 mM) were added to the reaction mixture which is further stirred for 3 h at room temperature. The obtained dark-brown mixture was filtered through a pad of 20 g of celite filter aid, the cake was washed with 60 ml of dichloromethane and the filtrate was concentrated to approximately ⅓, followed by precipitation with cyclohexane/hexane 50 ml/50 ml. The obtained brown precipitate was filtered off, washed with 10 ml of hexane and dried to give 3.80 g (4.80 mM, 96%) of 4-{6-[(E)-(4-{(E)-[4-(dimethylamino) phenyl]diazenyl}phenyl)diazenyl]-2,3-dihydro-1H-perimidin-2-yl}phenyl 4-{[6-(acryloyloxy)hexyl]oxy}benzoate dark-brown powder; $\lambda_{max}$=547 nm, $\epsilon$=53000 (THF). For total purification, the dye might be flash chromatographed on silica gel.

EXAMPLE 4

Preparation of Bis{4-((E)-{4-[(4-{[6-(methacryloyloxy)hexyl]oxy}benzoyl)oxy]-1-naphthyl}diazenyl) phenyl}-(E)-diazene

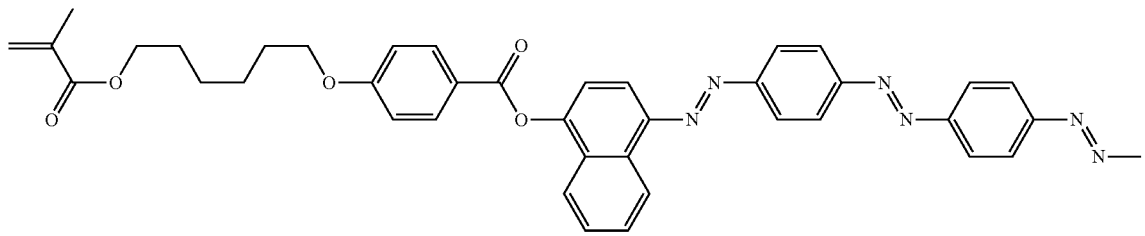

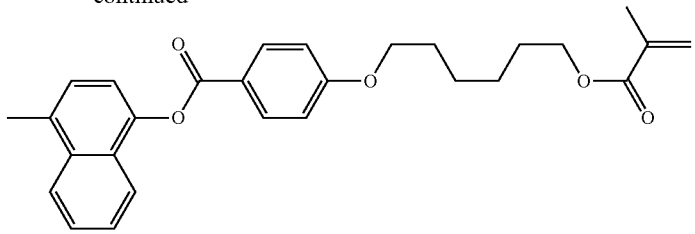

1) Bis{4-[(E)-(4-hydroxy-1-naphthyl)diazenyl]phenyl}-(E)-diazene

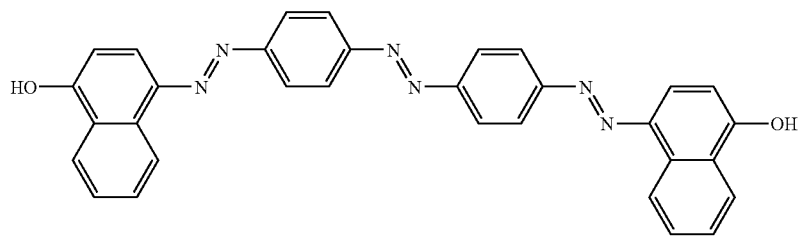

1.06 g of 4-[(E)-(4-aminophenyl)diazenyl]phenylamine (5.00 mM) were dissolved in 15 ml of water and 3 ml of hydrochloric acid 37%. The red solution was cooled to 5° C. and a solution of 0.70 g of sodium nitrite (10.00 mM) in 5 ml of water was added dropwise at this temperature. When the addition was complete, the mixture was stirred for 1h at 5° C. and then the excess of nitrite was destroyed by addition of ca. 0.1 g of urea and the mixture stirred for further 5 min. To the reaction mixture was added a solution of 1.44 g of 1-naphthol (10.00 mM), 0.6 g of sodium hydroxide and 2.0 g of potassium acetate in 10 ml of water. When addition was complete, the pH was adjusted to pH≈7 by addition of soda and the coupling mixture was stirred for 2 h between 0-10° C. Then it was made slightly acidic by addition of glacial acetic acid and the precipitate was filtered off, washed several times with water and dried. The resulting orange powder was boiled for 1 h in 50 ml of dichloromethane, cooled to room temperature and the solid was filtered off, washed with dichloromethane and dried to give 2.20 g (4.20 mM, 84%) of bis{4-[(E)-(4-hydroxy-1-naphthyl)diazenyl]-phenyl}-(E)-diazene as orange crystals.

2) Bis{4-((E)-{4-[(4-{[6-(methacryloyloxy)hexyl]oxy}benzoyl)oxy]-1-naphthyl}diazenyl)phenyl}-(E)-diazene

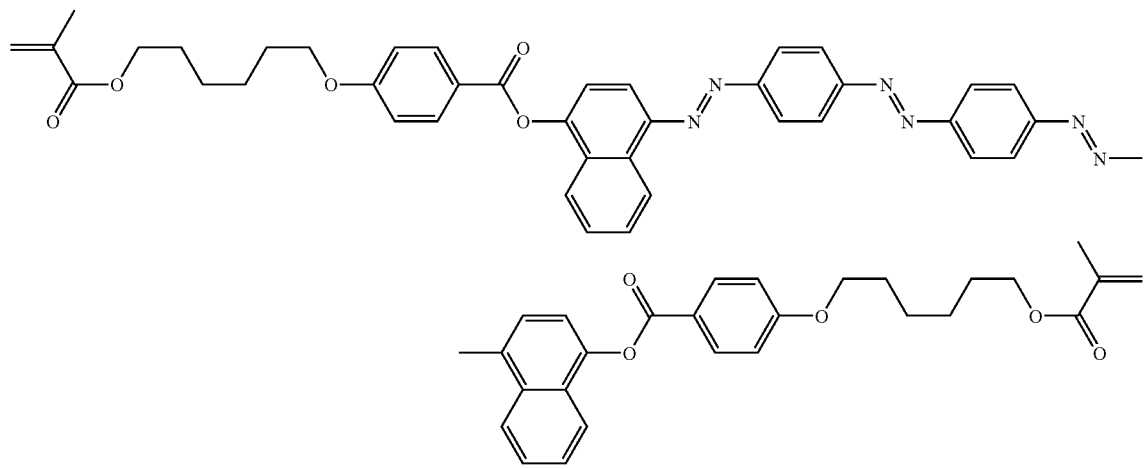

1.28 g of 4-{[6-(methacryloyloxy)hexyl]oxy}benzoic acid (4.20 mM) were dissolved in 30 ml of THF and 4.00 g of triethylamine (40.00 mM). The solution was cooled to −30° C. and 0.48 g of methansulfochloride (4.20 mM) were added. The mixture was stirred for 0.5 h at this temperature, then 1.04 g of bis{4-[(E)-(4-hydroxy-1-naphthyl)diazenyl]phenyl}-(E)-diazene (2.00 mM) were added at once, followed by 50 mg of DMAP. The reaction mixture was stirred for 1 h at −30° C. and was allowed to warm to room temperature while stirred overnight. The next day, the reaction mixture was poured onto 200 ml of water, the resulting suspension was stirred for 10 min. and the solids were filtered off, washed with water and dried. The resulting orange powder was boiled for 1 h in 25 ml of ethanol, cooled to room temperature and the solid was filtered off, washed with ethanol and dried to give 1.60 g (1.46 mM, 73%) of bis{4-((E)-{4-[(4-{[6-(methacryloyloxy)hexyl]oxy}benzoyl)oxy]-1-naphthyl}diazenyl)-phenyl}-(E)-diazene as orange crystals; $\lambda_{max}$=428 nm, $\epsilon$=52000 (THF).

EXAMPLES 5-23

The structural formulae and UV-data ($\lambda_{max}$- and $\epsilon$-values; in THF, if not otherwise indicated) of further dichroic dyes according to the invention, synthesized using similar methods as described in examples 1-4, will hereinafter be given.

EXAMPLE 5

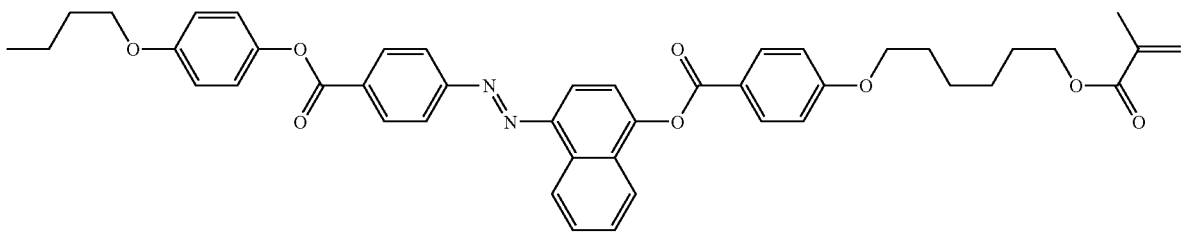

$\epsilon$=21000, $\lambda_{max}$=392 nm

EXAMPLE 6

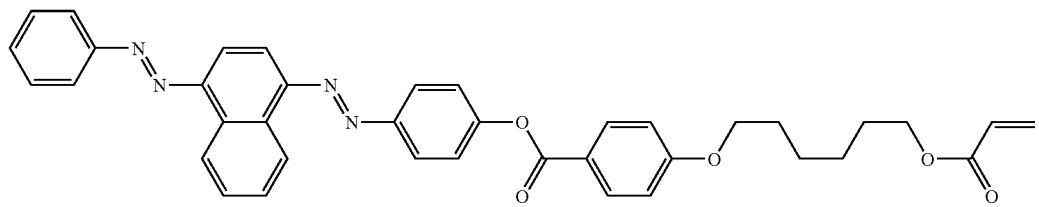

$\epsilon$=44000, $\lambda_{max}$=420 nm (CH$_2$Cl$_2$)

EXAMPLE 7

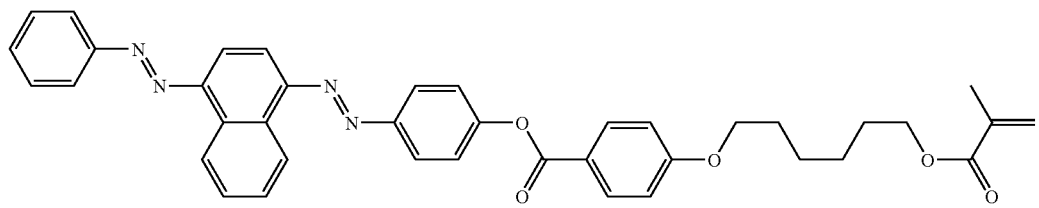

$\epsilon$=43000, $\lambda_{max}$=420 nm (CH$_2$Cl$_2$)

EXAMPLE 8

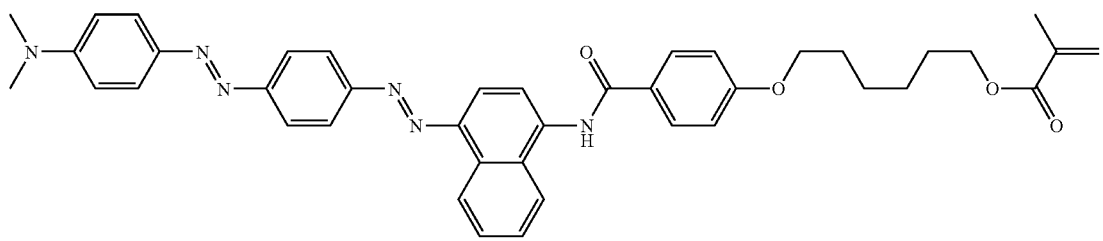

$\epsilon$=44000, $\lambda_{max}$=488 nm

EXAMPLE 9
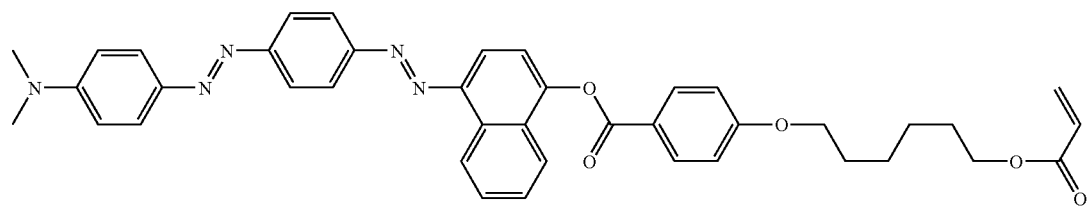
ε=41000, λ$_{max}$=483 nm
EXAMPLE 10
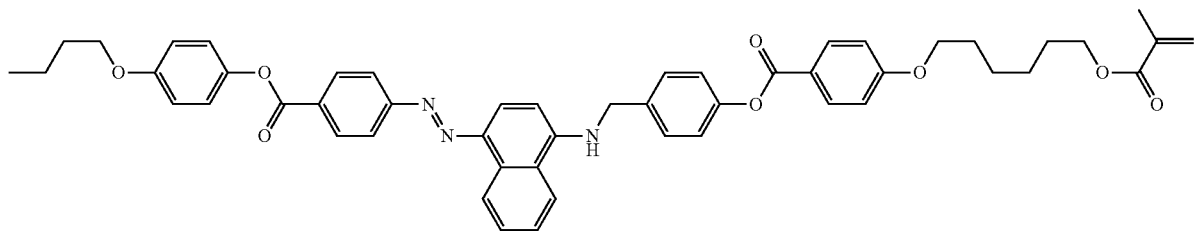
ε=33000, λ$_{max}$=486 nm
EXAMPLE 11
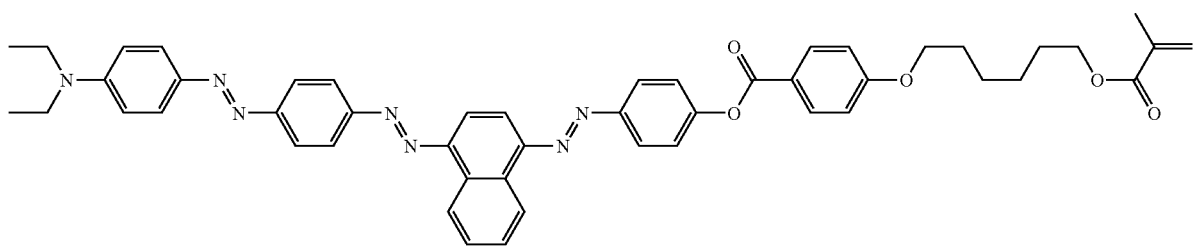
ε=51000, λ$_{max}$=523 nm
EXAMPLE 12
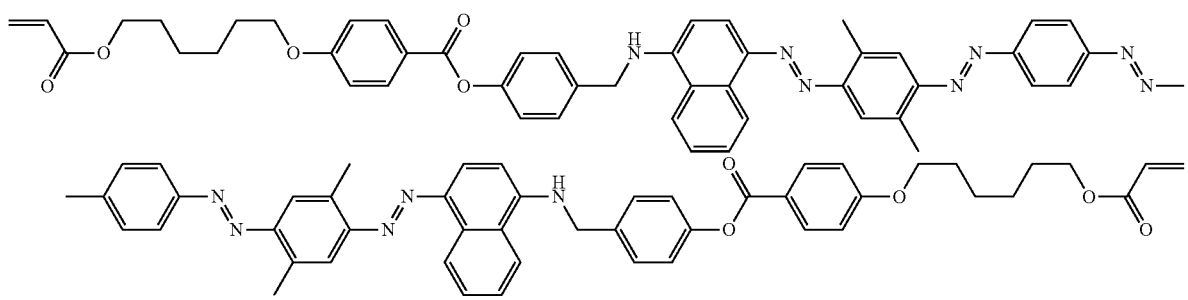
ε=63000, λ$_{max}$=546 nm EXAMPLE 13
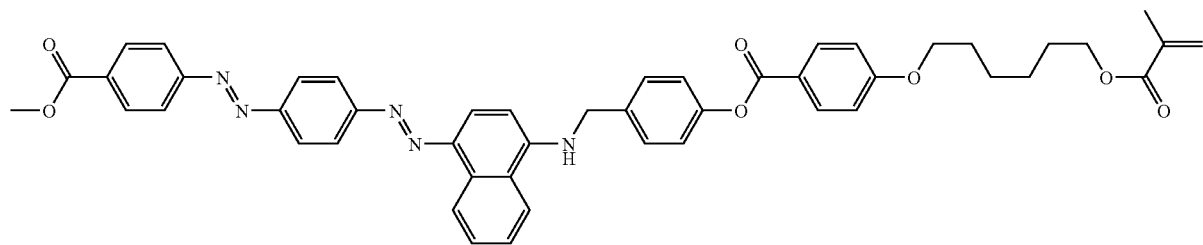
ε=39000, λ_{max}=532 nm
EXAMPLE 14
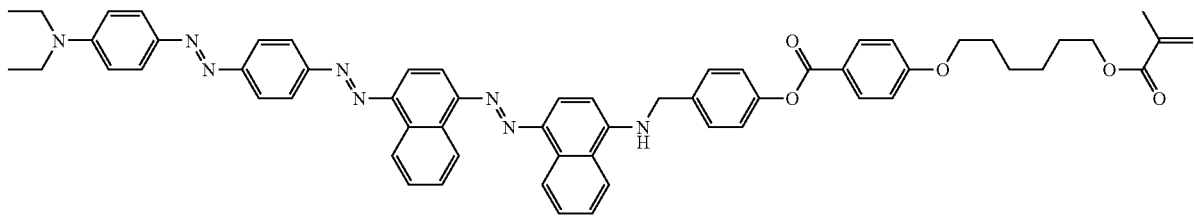
ε=55000, λ_{max}=579 nm
EXAMPLE 15
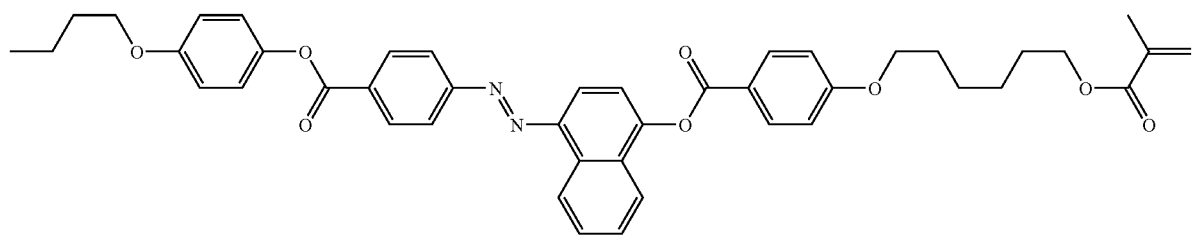
ε=21000, λ_{max}=392 nm
EXAMPLE 16
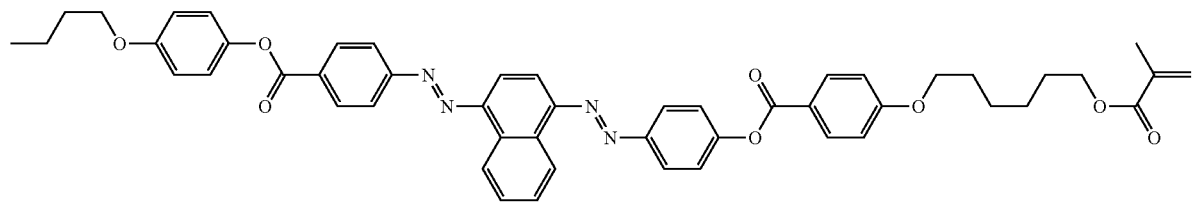
ε=28000, λ_{max}=432 nm

EXAMPLE 17
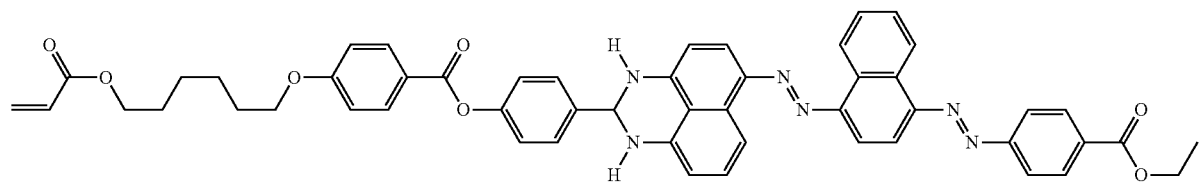
ε=32000, λ$_{max}$=615 nm
EXAMPLE 18
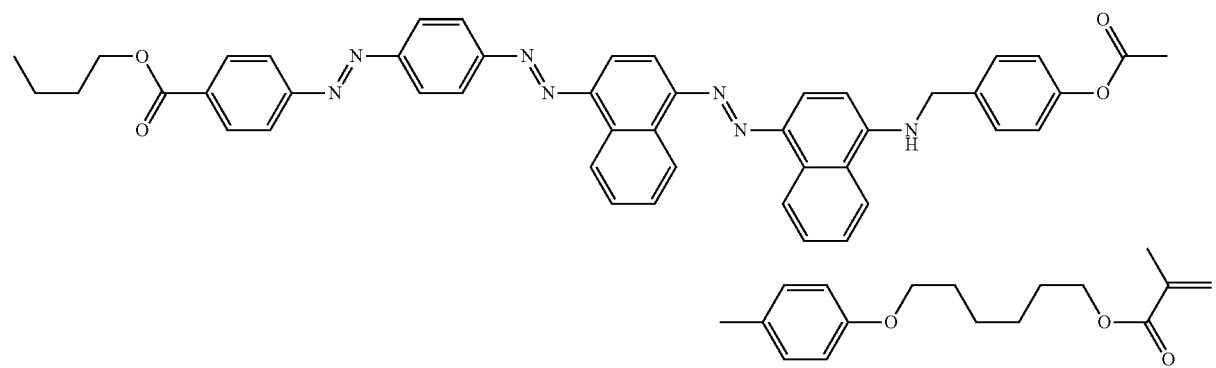
ε=39000, λ$_{max}$=583 nm
EXAMPLE 19
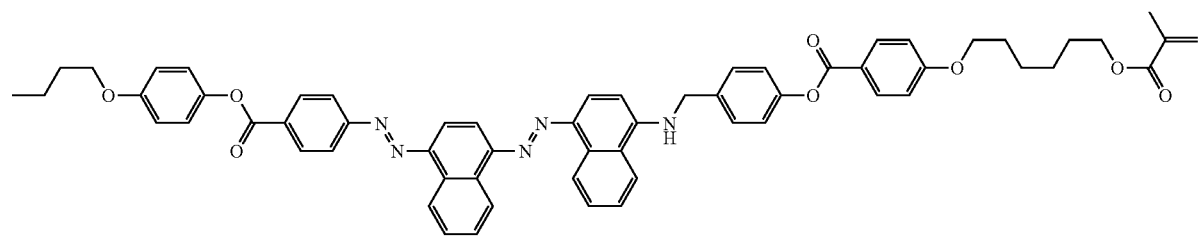
ε=37000, λ$_{max}$=576 nm
EXAMPLE 20
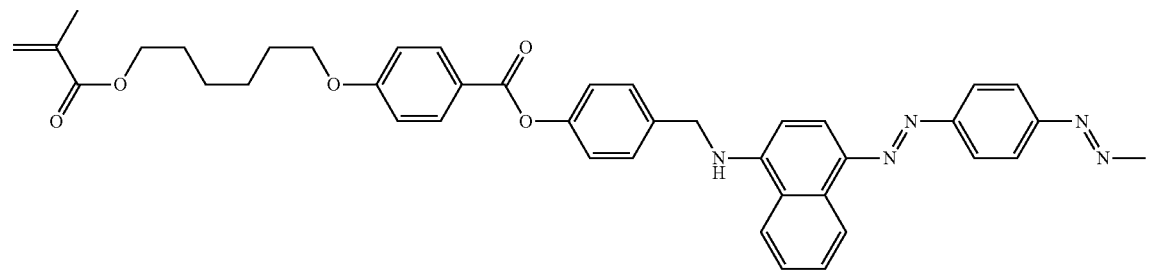

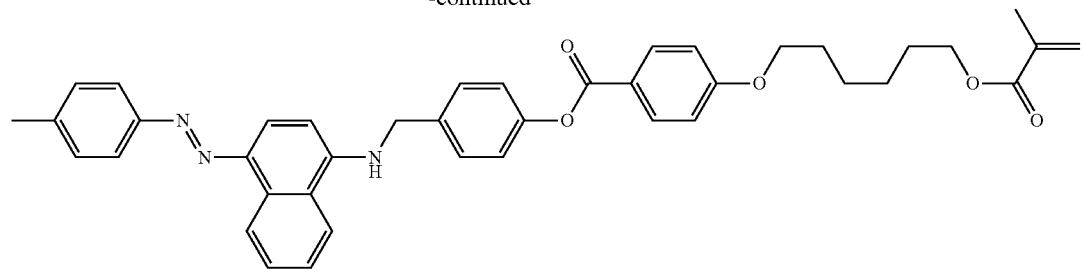
ε=75000, λ_max=559 nm
EXAMPLE 21
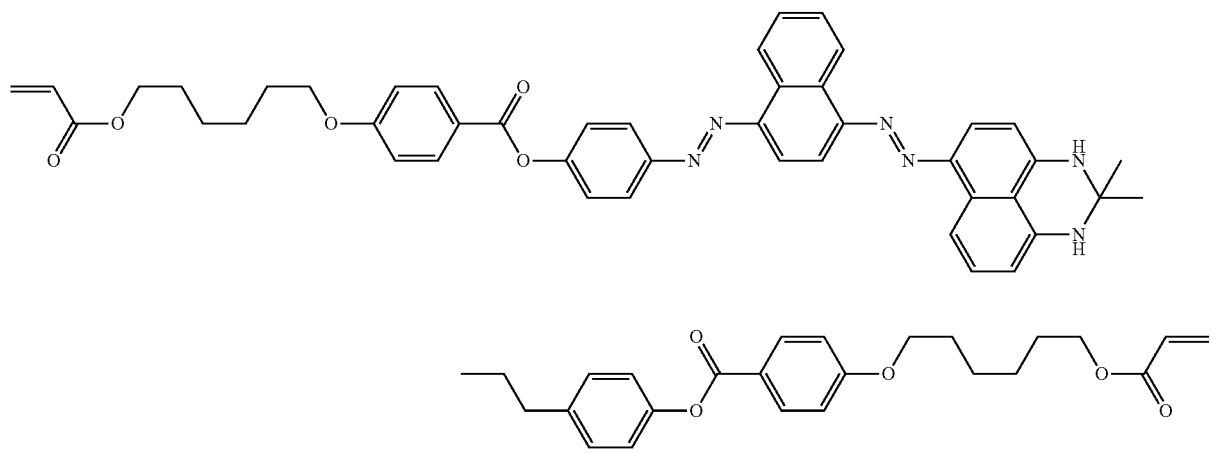
ε=26000, λ_max=605 nm
EXAMPLE 22
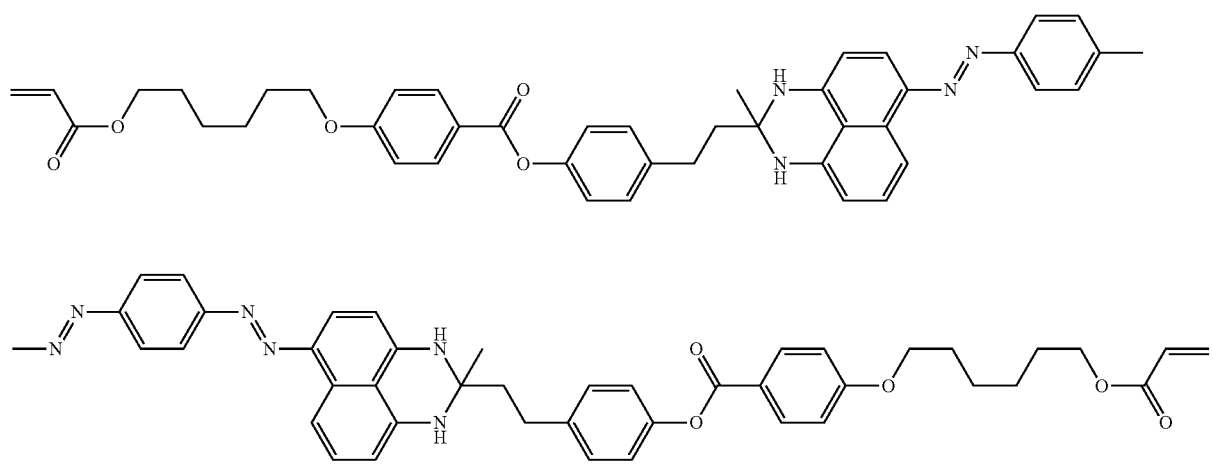
ε=54000, λ_max=592 nm

EXAMPLE 23

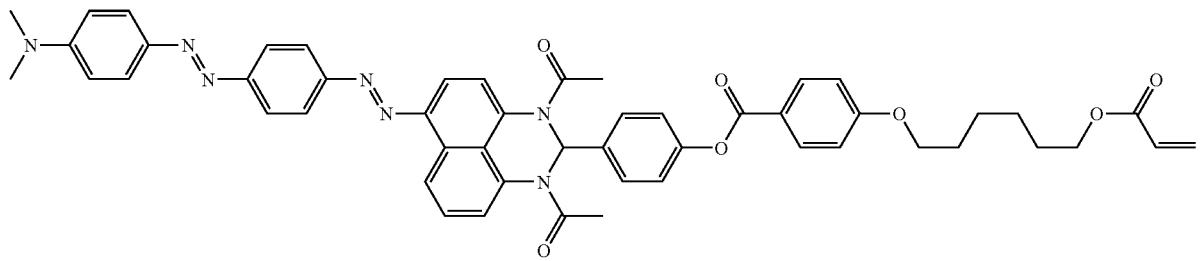

$\epsilon=44000$, $\lambda_{max}=501$ nm ($CH_2Cl_2$)

EXAMPLES FOR THE PREPARATION OF DICHROIC MIXTURES

The order parameter shown hereinafter in the examples 24-30 were each obtained by dissolving a dichroic dye in a LCP mixture $M_{LCP}$. The mixture $M_{LCP}$ was composed of 99 weight % of the LCP monomer:

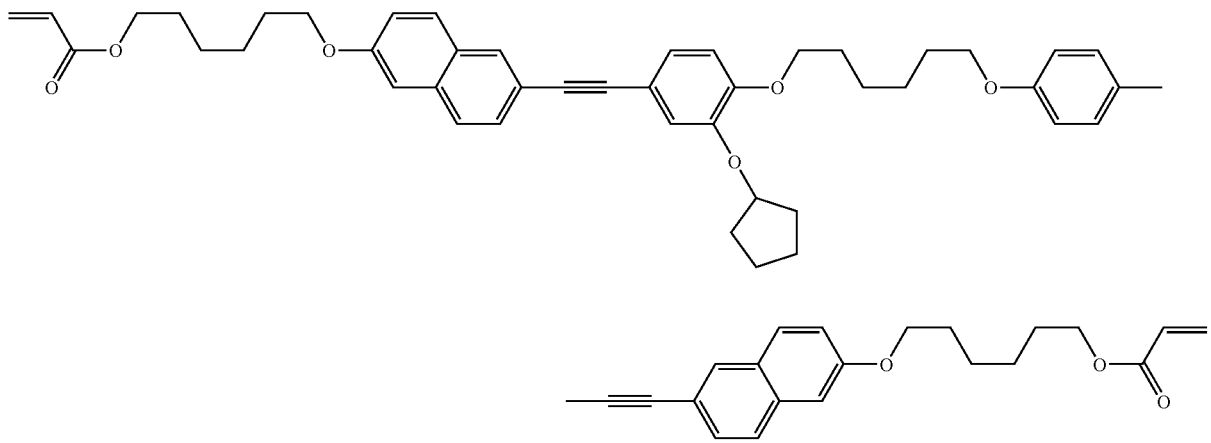

and 1 weight % of Tinuvin 123 (Ciba).

To this mixture $M_{LCP}$ were added 2 weight % of the photo initiator IRGARCURE369 (Ciba) and the below given amount of the respective dichroic dye to give the mixture $M_{LCP/DYE}$.

EXAMPLES FOR THE PREPARATION OF DICHROIC LCP FILMS

Samples of dichroic LCP films were prepared, whereby each sample comprised an alignment layer and a dichroic liquid crystal polymer layer. The alignment layers were made using the linearly photo-polymerizable aligning (LPP) technique. The preparation of the samples is described in the following.

Suitable LPP materials for the production of an LPP orientation layer are, for example, described in patent publications EP 0 611 786, WO 96/10049 and EP 0 763 552, and include cinnamic acid derivatives and ferulic acid derivatives. For the examples, the following LPP material was chosen:

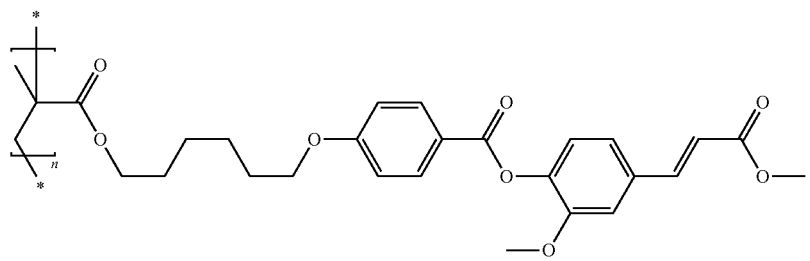

A 2% solution of this LPP material in methylpropylketone (MPK) as a solvent was spin-coated at 2000 rpm for 60 seconds at room temperature (20° C.). The layer was then dried for 5 to 10 minutes at 130 to 150° C. on a hot stage. Subsequently, the layer was exposed to linearly polarized light from a mercury high-pressure lamp for 10 to 550 seconds (depending on the strength of the lamp and on the characteristics of LPP and dichroic LCP layers) at room temperature. The layer was then used as an orientation layer for a liquid crystal material comprising dichroic dyes.

For the production of the dichroic LCP layers, the mixtures $M_{LCP/DYE}$ were dissolved in anisole to give a 30 wt % solution. These LCP mixtures were then spin-coated at 800 rpm for 60 seconds on top of the photo-exposed LPP layers. The spin-coated dichroic LCP layers were then dried at 60° C. for approximately 1 minute on a hot stage. For photo-initiated cross-linking of the liquid crystals and dye components, the layers were exposed to isotropic light from a xenon lamp for about 5 minutes (depending on the strength of the lamp) in an inert atmosphere.

Using the procedure described above, seven different examples, Examples 24-30, of photo-aligned dichroic LCP layers on glass substrates were prepared and their order parameter S measured at the indicated wavelength.

EXAMPLES OF ORDER PARAMETERS

EXAMPLE 24

For this example, 4 weight % of the dichroic dye

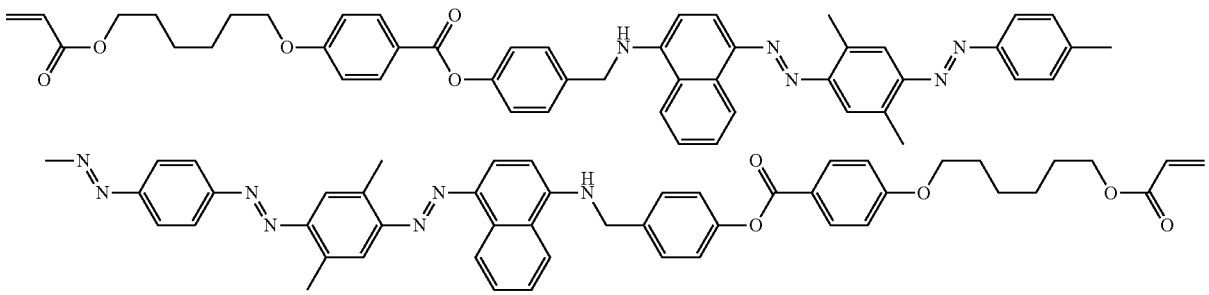

in the mixture $M_{LCP/DYE}$ was used.
The result for the order parameter S measured at the wavelength $\lambda_{max}$=566 nm was: S=0.81.

EXAMPLE 25

For this example, 4 weight % of the dichroic dye

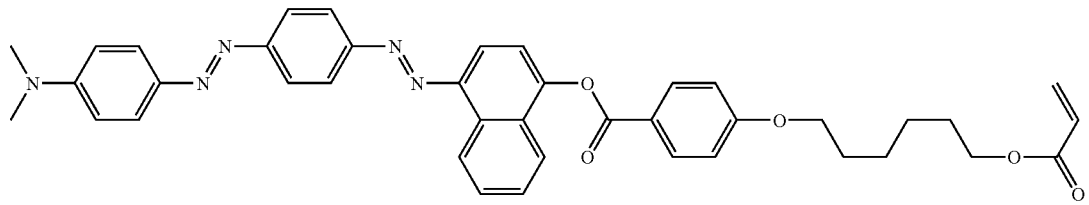

in the mixture $M_{LCP/DYE}$ was used.
The result for the order parameter S measured at the wavelength $\lambda_{max}$=508 nm was: S=0.85.

EXAMPLE 26

For this example, 4 weight % of the dichroic dye

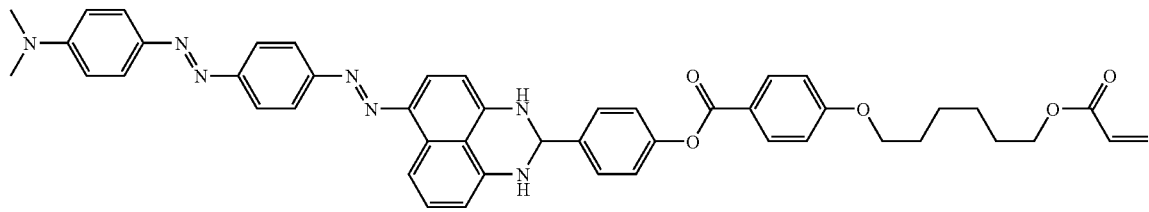

in the mixture $M_{LCP/DYE}$ was used.
The result for the order parameter S measured at the wavelength $\lambda_{max}$=556 nm was: S=0.84.

EXAMPLE 27
For this example, 4 weight % of the dichroic dye
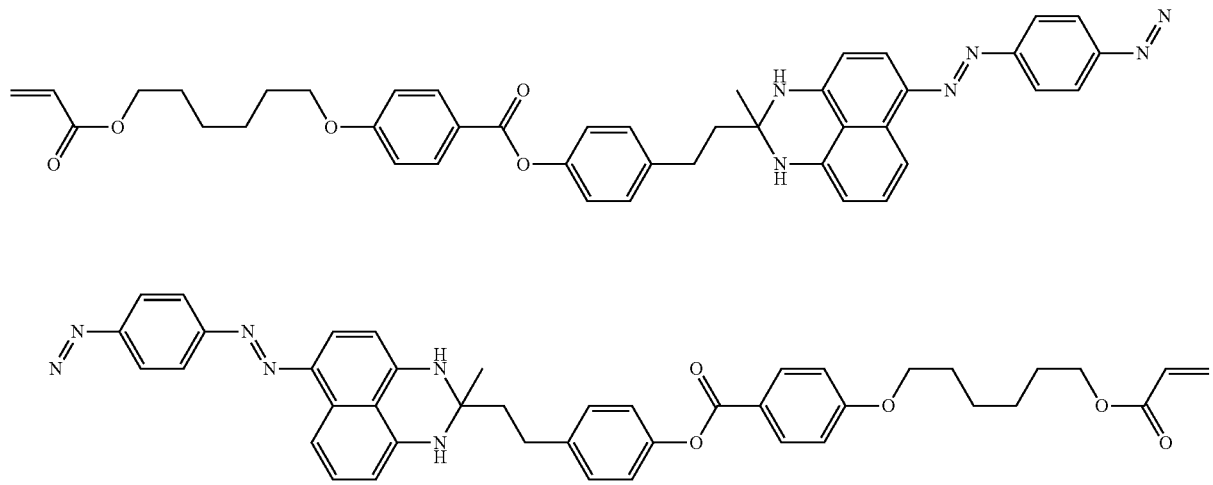
in the mixture $M_{LCP/DYE}$ was used.
The result for the order parameter S measured at the wavelength $\lambda_{max}$=600 nm was: S=0.84.
EXAMPLE 28
For this example, 2 weight % of the dichroic dye
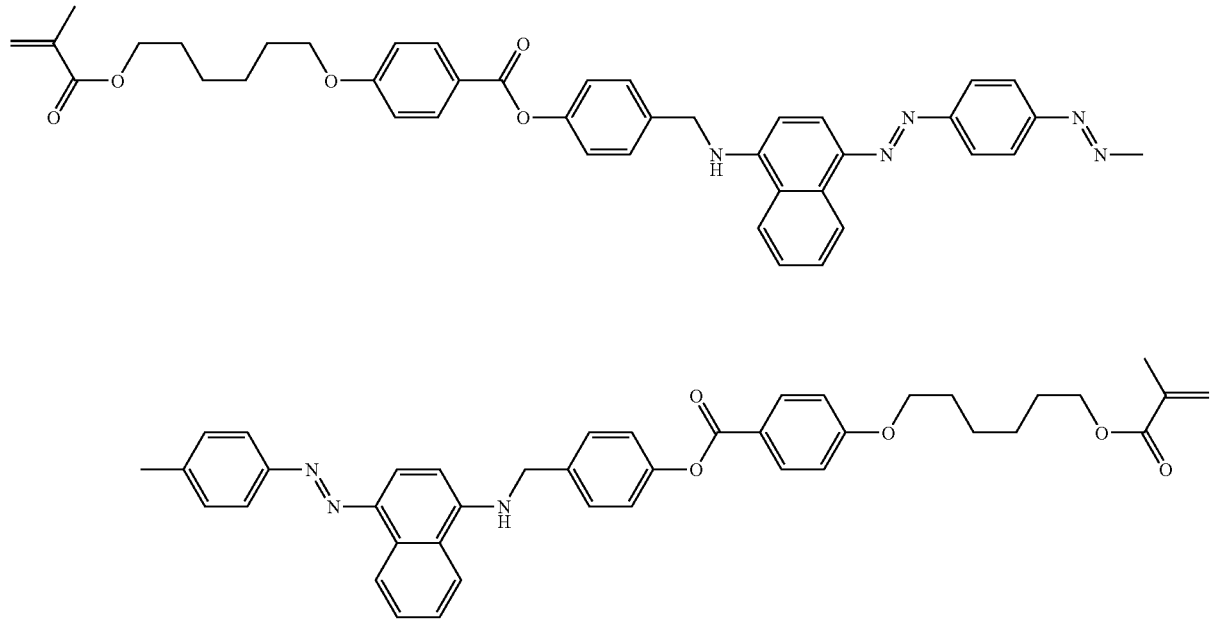
in the mixture $M_{LCP/DYE}$ was used.
The result for the order parameter S measured at the wavelength $\lambda_{max}$=566 nm was: S=0.90.

EXAMPLE 29

For this example, 4 weight % of the dichroic dye

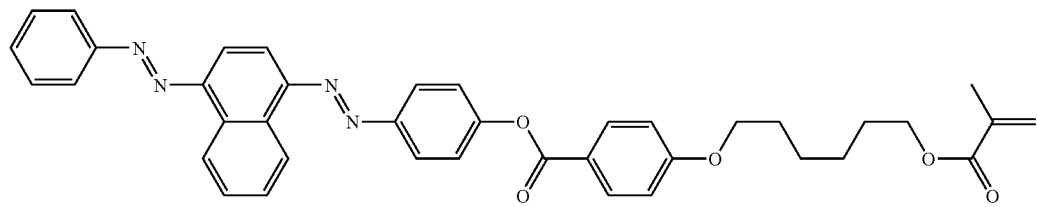

in the mixture $M_{LCP/DYE}$ was used.

The result for the order parameter S measured at the wavelength $\lambda_{max}$=456 nm was: S=0.77.

EXAMPLE 30

For this example, 4 weight % of the dichroic dye

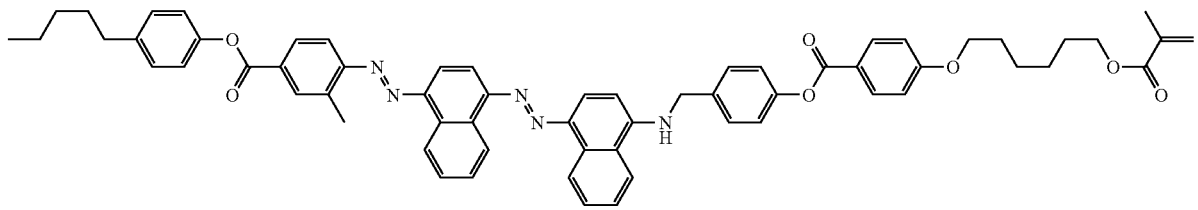

in the mixture $M_{LCP/DYE}$ was used.

The result for the order parameter S measured at the wavelength $\lambda_{max}$=578 nm was: S=0.82.

EXAMPLES 31-33

The structural formulae and UV-data ($\lambda$max- and $\epsilon$-values; in THF) of further dichroic dyes according to the invention, synthesized using similar methods as described in examples 1-4, will hereinafter be given.

EXAMPLE 31

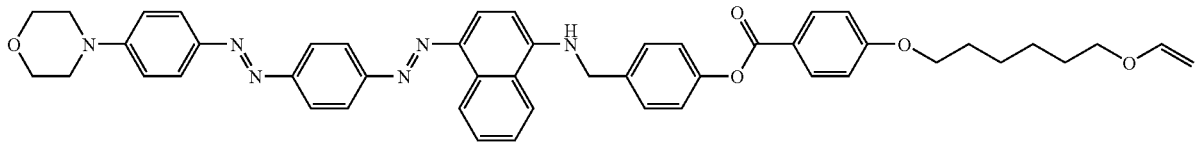

$\epsilon$=44000, $\lambda_{max}$=517 nm

EXAMPLE 32

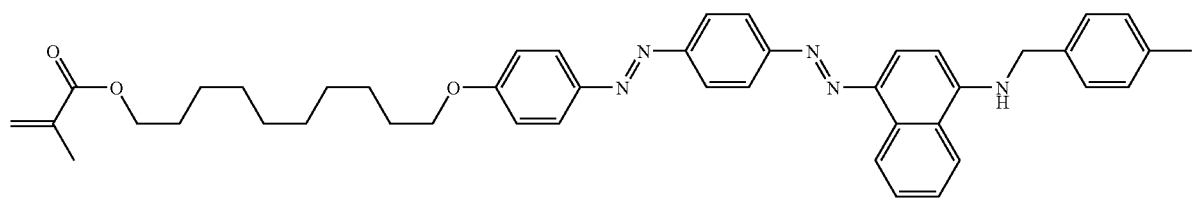

-continued

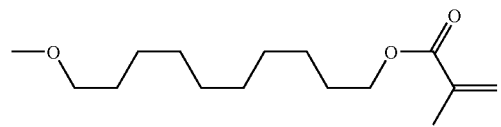

ε=47000, λ$_{max}$=515 nm

EXAMPLE 33

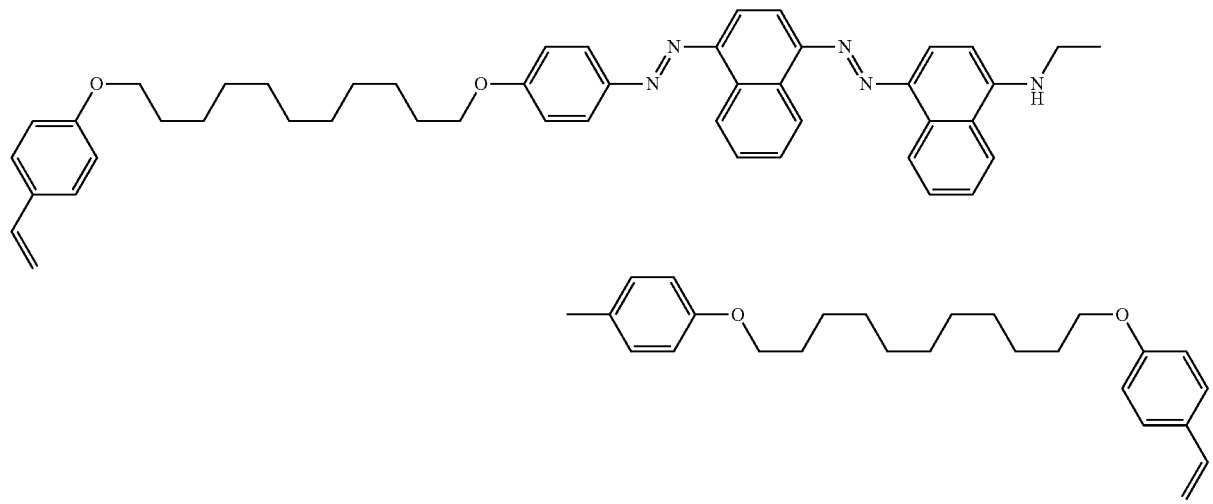

ε=42300, λ$_{max}$=552 nm

The invention claimed is:
1. A polymerizable dichroic azo dye of the general formula I:

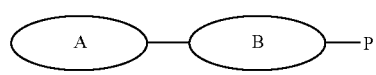

wherein:
A is a dichroic residue represented by formulae IIIa or IIIb:

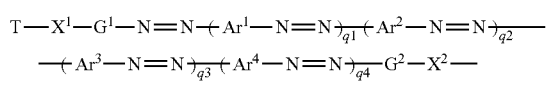

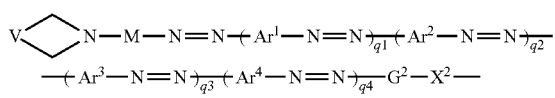

wherein
Ar$^1$, Ar$^2$, Ar$^3$, Ar$^4$ independently of each other are 1,4-phenylene, 1,4- or 1,5-naphthylene, which are unsubstituted, mono- or poly-substituted by fluorine, chlorine, hydroxy, —NR$^1$R$^2$ or by a straight chain or branched alkyl residue having 1-10 carbon atoms, which alkyl residue is unsubstituted, mono- or poly-substituted by fluorine, and wherein one or more of the non-adjacent CH$_2$ groups may independently be replaced by Q, wherein Q represents —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH=CH—, —C≡C—, or —O—CO—O—, wherein R represents hydrogen or a straight chain or branched hydrocarbon radical having 1 to 6 carbon atoms, and R$^1$ and R$^2$ independently represent hydrogen or a straight chain or branched chain hydrocarbon radical having 1 to 6 carbon atoms;
q$^1$, q$^2$, q$^3$, q$^4$ independently are 0 or 1, and wherein the sum of the integers q$^1$+q$^2$+q$^3$+q$^4$ is 1 or 2;
G$^1$, G$^2$ represent independently of each other 1,4-phenylene or a group of formula a) to f)

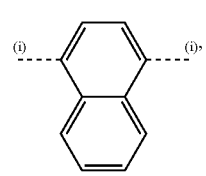

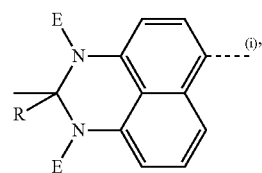

-continued

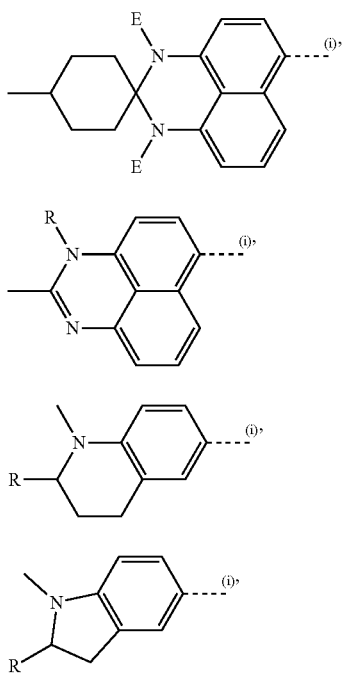

T represents a group of substructure IV

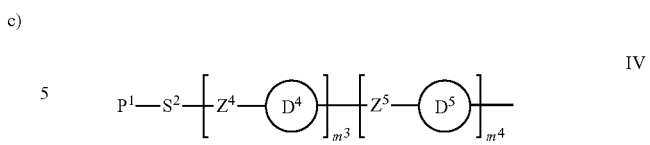

wherein

P¹ represents hydrogen, halogeno, cyano, nitro or a polymerizable group PG; which is CH₂=CY—, CH₂=CY—COO—, CH₂=CH—CO—NH—, CH₂=C(Ph)-CO—NH—, CH₂=CH—O—, CH₂=CH—OOC—, Ph-CH=CH—, CH₂=CH-Ph-, CH₂=CH-Ph-O—, CH₂=CH-Ph-OCO—, R³-Ph-CH=CH—COO—, R²—OOC—CH=CH-Ph-O—, N-maleinimidyl,

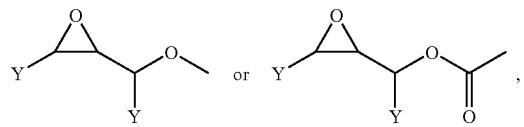

wherein Y each independently represents hydrogen, chloro or methyl, R² is hydrogen or straight chain or branched hydrocarbonoxy radicals having 1 to 6 carbon atoms, Ph- is phenyl and -Ph- is 1,4-phenylene, S² represents a single covalent bond or a straight-chain or branched alkylene residue, which is unsubstituted, mono-substituted by cyano or halogeno, or poly-substituted by halogeno, having 1 to 24 carbon atoms, wherein one or more of the non-adjacent CH₂ groups independently from each other may optionally be replaced by Q, wherein Q has the meaning given above and such that heteroatoms are not directly linked to each other;

Z⁴, Z⁵ each independently represent a single covalent bond or a straight-chain or branched alkylene residue, which is unsubstituted, mono-substituted by cyano or halogeno, or poly-substituted by halogeno, having 1 to 8 carbon atoms, wherein one or more of the non-adjacent CH₂ groups independently from each other may be optionally replaced by Q or —CR=C—CO—, wherein Q and R have the meaning given above; and D⁴, D⁵ each independently represent an aromatic or alicyclic group, which is unsubstituted or substituted by fluorine, chlorine, cyano, nitro, or by a straight chain or branched alkyl residue having 1-10 carbon atoms, which alkyl residue is unsubstituted, mono- or poly-substituted by fluorine, and wherein one or more of the non-adjacent CH₂ groups independently from each other may optionally be replaced by Q, wherein Q has the meaning given above;

m³ and m⁴ are independently of each other 0 or 1;

X₁, X² represent independently of each other a single covalent bond or a straight-chain or branched alkylene residue, which is unsubstituted, mono-substituted by cyano or halogeno, or poly-substituted by halogeno, having 1 to 8 carbon atoms, wherein one or more of the non-adjacent CH₂ groups independently from each other may optionally be replaced by —O—, —CO—, —CO—O—, —O—CO—, —Si(CH₃)₂—O—Si(CH₃)₂—, —NW—, —NW—CO—, which are unsubstituted, mono- or poly-substituted by fluorine, chlorine, hydroxy, —NR¹R² or by a straight chain or branched alkyl residue having 1-10 carbon atoms, which alkyl residue is unsubstituted, mono- or poly-substituted by fluorine, and wherein one or more of the non-adjacent CH₂ groups independently from each other may optionally be replaced by —O—, —CO—O—, —O—CO—, —NR¹—CO—, —CO—NR¹—, —NR¹—CO—O—, —O—CO—NR¹—, —CH=CH—, —C≡C—, —O—CO—O—, wherein R¹ and R² independently represent hydrogen or a straight chain or branched hydrocarbon radical having 1 to 6 carbon atoms and wherein the broken line (i) symbolizes the possible linkages to the azo-binding group and wherein R represents hydrogen or a straight chain or branched hydrocarbon radical having 1 to 6 carbon atoms;

E each independently represents hydrogen, a straight chain or branched hydrocarbon radical having 1 to 6 carbon atoms, or acetyl, propionyl, butyryl, isobutyryl, or a polymerizable group selected from acryloyl or methacryloyl;

M represents 1,4-phenylene, 1,4-naphthylene which are unsubstituted, mono- or poly-substituted by fluorine, chlorine, hydroxy, —NR¹R² or by a straight chain or branched alkyl residue having 1-10 carbon atoms, which alkyl residue is unsubstituted, mono- or poly-substituted by fluorine, and wherein one or more of the non-adjacent CH₂ groups independently from each other may optionally be replaced by —O—, —CO—O—, —O—CO—, —NR¹—CO—, —CO—NR¹—, —NR¹—CO—O—, —O—CO—NR¹—, —CH=CH—, —C≡C—, —O—CO—O—, wherein R¹ and R² independently represent hydrogen or a straight chain or branched hydrocarbon radical having 1 to 6 carbon atoms;

—CO—NW—, —NW—CO—O—, —O—CO—NW—, —NW—CO—NW—, —CH=CH—, —C≡C—, —O—CO—O— or —CW=C—CO—, wherein W represents a group of substructure V P²-Sp-   V wherein
p² represents hydrogen, cyano or a polymerizable group PG, which is CH₂=CY—, CH₂=CY—COO—, CH₂=CH—CO—NH—, CH₂=C(Ph)-CO—NH—, CH₂=CH—O—, CH₂=CH—OOC—, Ph-CH=CH—, CH₂=CH-Ph-, CH₂=CH-Ph-O—, CH₂=CH-Ph-OCO—, R³-Ph-CH=CH—COO—, R²—OOC—CH=CH-Ph-O—, N-maleinimidyl,

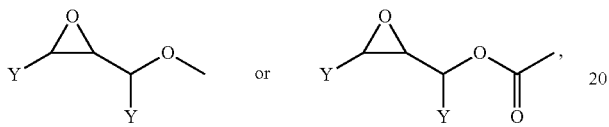

wherein Y each independently represents hydrogen, chloro or methyl, R² is hydrogen or a straight chain or branched hydrocarbon radical having 1 to 6 carbon atoms, R³ is hydrogen or a straight chain or branched hydrocarbonoxy radical having 1 to 6 carbon atoms, Ph- is phenyl and -Ph- is 1,4-phenylene, and Sp represents a single covalent bond or a straight-chain or branched alkylene residue, which is unsubstituted, mono-substituted by cyano or halogeno, or poly-substituted by halogeno, having 1 to 5 carbon atoms, wherein one or more of the non-adjacent CH₂ groups independently from each other may optionally be replaced by —O—, —CO—, —CO—O—, —O—CO—, such that heteroatoms are not directly linked to each other;

V is selected from a group consisting of a single covalent bond, —CH₂—, —CH₂—CH₂—, —CH₂—CH₂—CH₂—, —CH₂—O—CH₂—, —CH₂-NT-CH₂—, —CH₂—(—CH₂—)₂—CH₂—, wherein T has the meaning given above;

with the proviso that if G¹, G² and M are optionally substituted 1,4-phenylene, at least one of Ar¹, Ar², Ar³ or Ar⁴ is optionally substituted 1,4-naphthylene;

B represents a group of substructure II

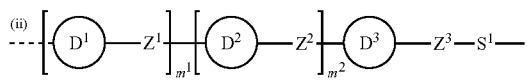

II wherein the broken line (ii) symbolizes the linkage to said dichroic residue and wherein:
D¹, D², D³ each independently represents an aromatic or alicyclic group, which is unsubstituted or substituted by fluorine, chlorine, cyano, nitro, or by a straight chain or branched alkyl residue having 1-10 carbon atoms, which alkyl residue is unsubstituted, mono- or poly-substituted by fluorine and wherein one or more of the non-adjacent CH₂ groups independently from each other may optionally be replaced by Q, whereby Q represents —O—, —CO—, —CO—O—, —O—CO—, —Si(CH₃)₂—O—Si(CH₃)₂—, —NR—, —NR—CO—, —CO—NR—, —NR—CO—O—, —O—CO—NR—, —NR—CO—NR—, —CH=CH—, —C≡C—, —O—CO—O— and R has the meaning given above;
S¹ represents a single covalent bond or a straight-chain or branched alkylene residue, which is unsubstituted, mono-substituted by cyano or halogeno, or poly-substituted by halogeno, having 1 to 24 carbon atoms, wherein one or more of the non-adjacent CH₂ groups independently from each other may optionally be replaced by Q, wherein Q has the meaning given above and wherein heteroatoms are not directly linked to each other;
Z¹, Z² each independently represents a single covalent bond or a straight-chain or branched alkylene residue, which is unsubstituted, mono-substituted by cyano or halogeno, or poly-substituted by halogeno, having 1 to 8 carbon atoms, wherein one or more of the non-adjacent CH₂ groups independently from each other may optionally be replaced by Q or —CR=C—CO—, wherein Q and R have the meaning given above;
Z³ is —O—CH₂—;
m¹, m² independently are 0 or 1; and
P represents hydrogen, halogeno, cyano, nitro or a polymerizable group PG, which is CH₂=CY—, CH₂=CY—COO—, CH₂=CH—CO—NH—, CH₂=C(Ph)-CO—NH—, CH₂=CH—O—, CH₂=CH—OOC—, Ph-CH=CH—, CH₂=CH-Ph-, CH₂=CH-Ph-O—, CH₂=CH-Ph-OCO—, R³-Ph-CH=CH—COO—, R²—OOC—CH=CH-Ph-O—, N-maleinimidyl,

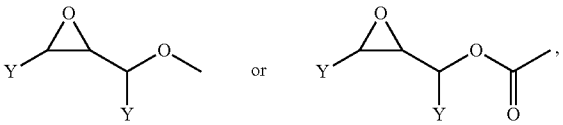

wherein Y each independently represents hydrogen, chloro or methyl, R² is hydrogen or a straight chain or branched hydrocarbon radical having 1 to 6 carbon atoms, R³ is hydrogen or a straight chain or branched hydrocarbonoxy radical having 1 to 6 carbon atoms, Ph- is phenyl and -Ph- is 1,4-phenylene; and with the proviso that the compound of formula I comprises at least one polymerizable group PG within the above given meaning.

2. A polymerizable dichroic azo dye according to claim 1, wherein the polymerizable groups PG are CH₂=CY—, CH₂=CY—COO—, CH₂=CH—O—, CH₂=CH—OOC—, CH₂=CH-Ph-O—, CH₂=CH-Ph-OCO—,

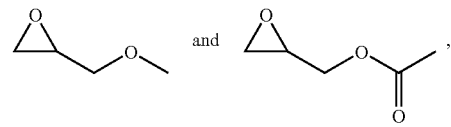

wherein Y is hydrogen or methyl.

3. A polymerizable dichroic azo dye according to claim 1, wherein the polymerizable groups PG are CH₂=CY—

COO—, CH$_2$=CH—O— and CH$_2$=CH—OOC—, wherein Y is hydrogen or methyl.

4. A polymerizable dichroic azo dye according to claim 1, wherein rings D$^1$, D$^2$, D$^3$, D$^4$ and D$^5$ independently of each other are unsubstituted, saturated five- or six-membered alicyclic rings or six- or ten-membered aromatic rings, which are unsubstituted, mono- or poly-substituted by fluorine or chlorine or nitro or by a straight chain or branched alkyl residue having 1-6 carbon atoms, which alkyl residue is unsubstituted, mono- or poly-substituted by fluorine, and wherein one or more of the non-adjacent CH$_2$ groups may independently be replaced by —O—, —CO—O—, —O—CO—, —NR$^2$—CO—, —CO—NR$^2$—, —NR$^2$—CO—O—, —O—CO—NR$^2$—, —CH=CH—, —C≡C—, —O—CO—O—, wherein R$^2$ represents hydrogen or lower alkyl.

5. A polymerizable dichroic azo dye according to claim 4, wherein rings D$^1$, D$^2$, D$^3$, D$^4$ and D$^5$ are unsubstituted cyclopentane-1,3-diyl, unsubstituted 1,3-dioxane-2,5-diyl, unsubstituted cyclohexane-1,4-diyl, unsubstituted naphthalene-2,6-diyl or 1,4-phenylene, which is unsubstituted, mono- or poly-substituted by fluorine or chlorine or by a straight-chain or branched alkyl residue having 1-3 carbon atoms, which alkyl residue is unsubstituted, mono- or poly-substituted by fluorine, and wherein one or more of the non-adjacent CH$_2$ groups may independently be replaced by —O—, —CO—O—, —O—CO—, —CH=CH—, —C≡C—.

6. A polymerizable dichroic azo dye according to claim 4, wherein rings D$^1$, D$^2$, D$^3$, D$^4$ and D$^5$ are 1,4-phenylene, which is unsubstituted, mono- or poly-substituted by fluorine, chlorine, methyl, methoxy, acyl or —CO—O—CH$_3$.

7. A polymerizable dichroic azo dye according to claim 1, wherein the S$^1$ and S$^2$ comprise a single bond, or a straight-chain or branched alkylene group or —(CH$_2$)$_r$—O—(CH$_2$)$_s$—, —(CH$_2$)$_r$—CO—O—(CH$_2$)$_s$—, —(CH$_2$)$_r$—O—CO—(CH$_2$)$_s$—, —(CH)$_r$—NR$^2$—CO—(CH$_2$)$_s$—, —(CH$_2$)$_r$—, —NR$^2$—CO—O—(CH$_2$)$_s$—, —(CH$_2$)$_r$—(OCH$_2$CH$_2$)$_s$—(CH$_2$)$_t$— wherein r, s and t are each an integer from 1 to 20, the sum of r+s+t≦21, wherein R$^2$ represents hydrogen or lower alkyl, and which are attached to the dichroic residue and the polymerizable group, respectively, such that heteroatoms are not directly linked to each other.

8. A polymerizable dichroic azo dye according to claim 7, wherein S$^1$ and S$^2$ are a single bond or a C$_{1-14}$ straight-chain alkylene group.

9. A polymerizable dichroic azo dye according to claim 1, wherein Sp is a single bond, or a straight-chain or branched alkylene group or —(CH$_2$)$_u$—O—(CH$_2$)$_v$—, —(CH$_2$)$_u$—CO—O—(CH$_2$)$_v$—, —(CH$_2$)$_u$—O—CO—(CH$_2$)$_v$—, wherein u and v are each an integer from 1 to 4, the sum of u+v≦4.

10. A polymerizable dichroic azo dye according to claim 9, wherein Sp is a single bond and a C$_{1-5}$ straight-chain alkylene group.

11. A polymerizable dichroic azo dye according to claim 1, wherein Z$^1$, Z$^2$, Z$^4$ and Z$^5$ are a single covalent bond or a straight-chain or branched alkylene residue, which is unsubstituted, mono-substituted or poly-substituted by fluoro, having 1 to 8 carbon atoms, wherein one or more of the non-adjacent CH$_2$ groups may independently be replaced by —O—, —CO—, —CO—O—, —O—CO—, —NR$^2$—CO—, —CO—NR$^2$—, —NR$^2$—CO—O—, —O—CO—NR$^2$—, —CH=CH—, —C≡C—, —O—CO—O—, —CR$^2$=C—CO—, wherein R$^2$ represents hydrogen or lower alkyl.

12. A polymerizable dichroic azo dye according to claim 11, wherein Z$^1$, Z$^2$, Z$^4$ and Z$^5$ groups are a single covalent bond or a straight-chain or branched alkylene residue, having 1 to 4 carbon atoms, wherein one or more of the non-adjacent CH$_2$ groups may independently be replaced by —O—, —CO—O—, —O—CO—, —CH=CH—, —C≡C—, —O—CO—O—, —CR$^2$=C—CO—, wherein R$^2$ represents hydrogen or lower alkyl.

13. A polymerizable dichroic azo dye according to claim 12, wherein Z$^1$, Z$^2$, Z$^4$ and Z$^5$ are each independently selected from a group consisting of a single covalent bond, —CO—O—, —O—CO—, —CH$_2$—O— or —O—CH$_2$—.

14. A polymerizable dichroic azo dye according to claim 1, wherein E represents hydrogen, methyl, acetyl, acryloyl and methacryloyl.

15. A polymerizable dichroic azo dye according to claim 1, wherein the sum of the integers m$^1$+m$^2$ is 0 or 1.

16. A polymerizable dichroic azo dye according to claim 1, wherein X$^1$ and X$^2$ when linked to 1,4-phenylene or 1,4-naphthylene each independently represent a single covalent bond, —CO—O—, —O—CO—, —CH$_2$—O—, —O—CH$_2$—, —NW—, —CH$_2$—NW—, —NW—CH$_2$—, —N=CR—, —CR=N—, —NW—CO— or —CO—NW—, wherein W has the meaning given above.

17. A polymerizable dichroic azo dye according to claim 1, wherein X$^1$ and X$^2$ when linked to a group of formula b), c) or d) each independently represent a single covalent bond, —CH$_2$—CH$_2$—, —O—CH$_2$ . . . (iv), —NW—CH$_2$ . . . (iv), —CH=CH—, —O—CH$_2$—CH$_2$—CH$_2$ . . . (iv) or —NW—CH$_2$—CH$_2$—CH$_2$ . . . (iv), wherein W has the meaning given above and the broken lines (iv) symbolize the linkage to the groups of formula b), c) or d).

18. A polymerizable dichroic azo dye according to claim 1, wherein X$^1$ and X$^2$ when linked to a group of formula e) or f) each independently represent —CH$_2$—, —CO—, —CH$_2$—CH$_2$—, —O—CH$_2$—CH$_2$ . . . (iv), —NW—CH$_2$—CH$_2$ . . . (iv), —CH=CH—CH$_2$ . . . (iv), —OCO—CH$_2$ . . . (iv) or —CH$_2$—OCO . . . (iv), wherein W has the meaning given above and the broken lines (iv) symbolize the linkage to the groups of formula e) or f).

19. A polymerizable dichroic azo dye according to claim 1, wherein V is selected from a group consisting of —CH$_2$—CH$_2$—, —CH$_2$—CH$_2$—CH$_2$—or —CH$_2$—O—CH$_2$—.

20. A polymerizable dichroic azo dye according to claim 1, wherein M is 1,4-phenylene, which is unsubstituted, mono-substituted by chlorine or —CH$_3$, with the proviso that at least one of Ar$^1$, Ar$^2$, Ar$^3$ or Ar$^4$ is optionally substituted 1,4-naphthylene.

21. A polymerizable dichroic azo dye according to claim 20, wherein M is unsubstituted 1,4-phenylene, with the proviso that at least one of Ar$^1$, Ar$^2$, Ar$^3$ or Ar$^4$ is 1,4-naphthylene.

22. A polymerizable dichroic azo dye according to claim 1, wherein Ar$^1$, Ar$^2$, Ar$^3$ and Ar$^4$ independently of each other are 1,4-phenylene or 1,4-naphthylene, which are unsubstituted, mono- or disubstituted by fluorine, chlorine, —OCH$_3$ or —CH$_3$, with the proviso that at least one of Ar$^1$, Ar$^2$, Ar$^3$ or Ar$^4$ is optionally substituted 1,4-naphthylene if G$^1$ and G$^2$ are optionally substituted 1,4-phenylene.

23. A polymerizable dichroic azo dye according to claim 22, wherein Ar$^1$, Ar$^2$, Ar$^3$ and Ar$^4$ independently of each other are 1,4-phenylene, which is unsubstituted, mono- or disubstituted by chlorine or —CH$_3$ or unsubstituted 1,4-naphthylene, with the proviso that at least one of Ar$^1$, Ar$^2$, Ar$^3$ and Ar$^4$ is unsubstituted 1,4-naphthylene if G$^1$ and G$^2$ are optionally substituted 1,4-phenylene.

24. A polymerizable dichroic azo dye according to claim 1, wherein

G$^1$ and G$^2$ independently of each other are 1,4-phenylene or 1,4-naphthylene, which are unsubstituted, mono- or disubstituted by fluorine, chlorine, —OCH₃ or —CH₃, or a group of formula b), c) and d), which are unsubstituted and wherein the broken lines (i) symbolize the linkage to the azo-binding group and R, E have the meaning given above tuted and wherein the broken lines (i) symbolize the linkage to the azo-binding group and R, E have the meaning given above

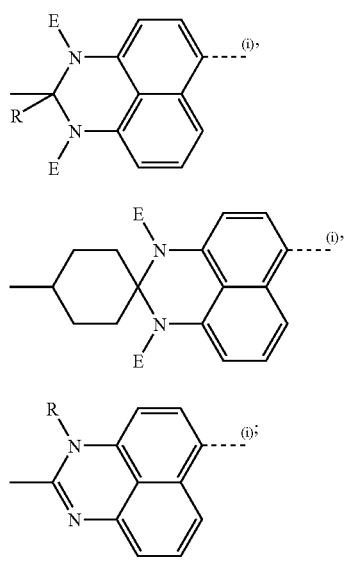

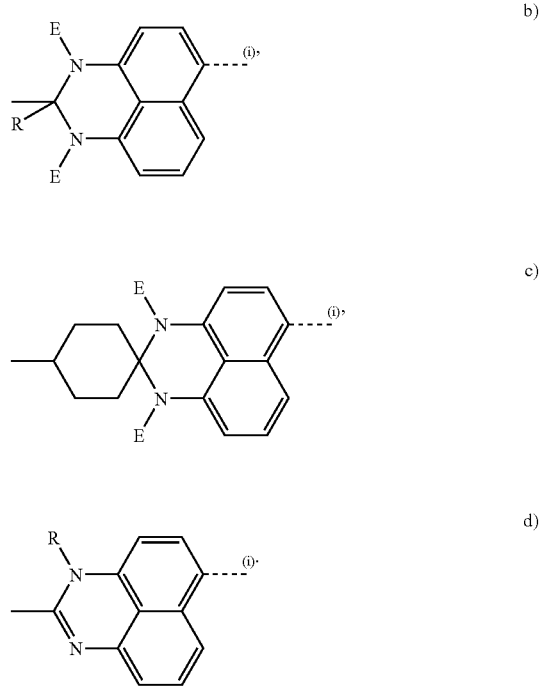

or a group of formula e) and f), which is unsubstituted and wherein the broken lines (i) symbolize the linkage to the azo-binding group and R represents hydrogen or lower alkyl

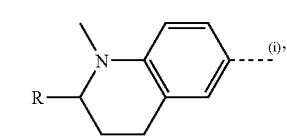

26. A polymerizable dichroic azo dye of the general formula I:

wherein A is a dichroic residue of general formula IIIa

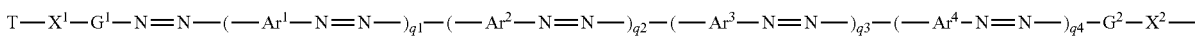

-continued

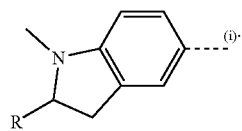

25. A polymerizable dichroic azo dye according to claim 24, wherein

G¹ and G² independently of each other are 1,4-phenylene or 1,4-naphthylene, which are unsubstituted, mono- or disubstituted by fluorine, chlorine, —OCH₃ or —CH₃, or a group of formula b), c) and d), which are unsubstiwherein G¹ and G² independently of each other represent 1,4-phenylene, which is unsubstituted, mono- or disubstituted by chlorine or —CH₃, or unsubstituted 1,4-naphthylene; or a group of formula b) or c)

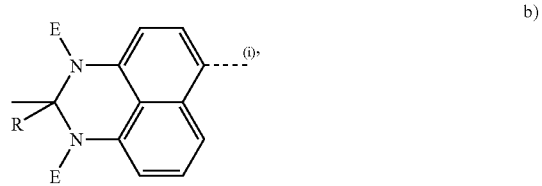

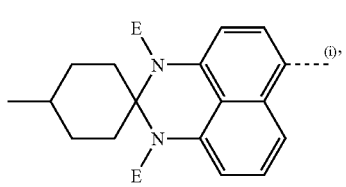

c)

wherein the broken lines (i) symbolize the linkage to the azo-binding group; and wherein E independently represents hydrogen, methyl and acetyl;

R independently represents hydrogen, methyl, ethyl, propyl and isopropyl;

$X^1$ and $X^2$ independently of each other represent a covalent bond, $CH_2$—$CH_2$—, —CO—O—, —O—CO—, —$CH_2$—O—, —O—$CH_2$—, —NR— or —$CH_2$—NR—, —NR—$CH_2$—, —NR—CO— or —CO—NR—, wherein R has the meaning given above;

B represents a group of substructure XXIII

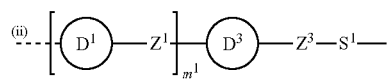
XXIII wherein the broken line (ii) symbolizes the linkage to said dichroic residue;

and wherein $Ar^1$, $Ar^2$, $Ar^3$, $Ar^4$ are independently of each other 1,4-phenylene, which is unsubstituted, mono-or disubstituted by chlorine or —$CH_3$, or unsubstituted 1,4-naphthylene, with the proviso that if $G^1$ and $G^2$ are optionally substituted 1,4-phenylene at least one of $Ar^1$, $Ar^2$, $Ar^3$ or $Ar^4$ is unsubstituted 1,4-naphthylene;

$q^1, q^2, q^3, q^4$ independently are 0 or 1, with the proviso that the sum of the integers $q^1+q^2+q^3+q^4$ is 1 or 2;

T represents a group of substructure IV

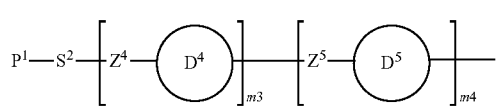
IV

P and $P^1$ independently of each other represent hydrogen, halogeno, cyano, nitro or a polymerizable group PG, wherein PG includes $CH_2$=CY—COO—, $CH_2$=CH—O— and $CH_2$=CH—OOC—, wherein Y is hydrogen or methyl;

$D^1, D^3, D^4$ and $D^5$ independently of each other represent 1,4-phenylene, which is unsubstituted, mono- or polysubstituted by fluorine, chlorine, methyl, methoxy, acyl or —CO—O—$CH_3$;

$Z^1, Z^4$ and $Z^5$ independently of each other represent selected from a group consisting of a single covalent bond, —CO—O—, —O—CO—, —$CH_2$—O— or —O—$CH_2$—;

$Z^3$ is —O—$CH_2$—;

$S^1$ and $S^2$ represent independently of each other a single bond, ethylene, propylene, butylene, pentylene, hexylene, heptylene, octylene, nonylene, decylene, undecylene, or dodecylene and $m^1, m^3, m^4$ are independently of each other 0 or 1, and with the proviso that the compound of formula I comprises at least one polymerizable group PG within the above given meaning.

27. A polymerizable dichroic azo dye according to claim 26, wherein if $G^1$ and $G^2$ independently of each other represent a group of formula b) or c), $X^1$ and $X^2$ independently of each other represent a covalent bond or $CH_2$—$CH_2$—.

28. Method for the preparation of mesogenic, polymerizable mixtures comprising polymerizing a polymerizable dichroic azo dye according to claim 1.

29. A mesogenic, polymerizable mixture comprising at least one polymerizable dichroic azo dye of formula I according to claim 1.

30. A mesogenic, polymerizable mixture according to claim 29, wherein the polymerizable dichroic azo dye is at a concentration of 0.01 to 50% wt.

31. A mesogenic, polymerizable mixture according to claim 29 further comprising another dichroic or non-dichroic dye.

32. A mesogenic, polymerizable mixture according to claim 29 further comprising at least one polymerizable liquid crystal (LCP).

33. A mesogenic, polymerizable mixture according to claim 29 further comprising additives selected from the group consisting of crosslinkers, stabilizers and photoinitiators.

34. A mesogenic, polymerizable mixture according to claim 29 comprising at least one dichroic dye of formula I and at least one polymerizable liquid crystal compound and optionally additives selected from the group consisting of crosslinkers, stabilizers and photoinitiators.

35. A mesogenic, polymerizable mixture according to claim 29 comprising one to four dichroic dyes of formula I and at least one polymerizable liquid crystal compound comprising two polymerizable groups and optionally additives selected from the group consisting of crosslinkers, stabilizers and photoinitiators.

36. Method for the preparation of dichroic liquid crystalline polymer films comprising polymerizing a mesogenic, polymerizable mixture according to claim 29.

37. A dichroic liquid crystalline polymer film comprising a mesogenic, polymerizable mixture according to claim 29.

38. Method for the manufacture of a polarizer or optical filter comprising incorporating a dichroic liquid crystalline film according to claim 37 into a polarizer or optical filter.

39. Process of preparing a dichroic liquid crystalline polymer film comprising a mesogenic, polymerizable mixture according to claim 29 comprising (i) preparing a solution of said mixture, (ii) applying said solution to a substrate by different coating techniques, (iii) evaporating the solvent to obtain a film, and (iv) polymerizing said film using UV light to give said dichroic liquid crystal film.

40. Process according to claim 39, wherein the dichroic liquid crystal films are further coated with protective layers for protection against oxygen, UV irradiation or mechanical stress.

41. Process according to claim 39, wherein the substrates include transparent substrates which are glass or plastic, including an orientation layer.

42. Process according to claim 41, wherein said orientation layer includes rubbed polyimide, polyamide or a layer of photo-orientable material.

43. Process according to claim 42, wherein said photo-orientable orientation layers are Linearly Photopolymerizable Polymers (LPP).

44. Multilayer systems formed from stacks of alternating LPP and LCP layers, wherein at least one of the LCP layers is a dichroic LCP film according to claim 37, and which are optionally covered by protecting layers against oxygen or humidity or layers for protection against ultraviolet radiation.

45. Process of preparing a dichroic liquid crystalline polymer film comprising a mesogenic, polymerizable mixture according to claim 29 comprising (i) preparing a solution of said mixture, (ii) admixing said solution with a photo-orientable material, (iii) evaporating the solvent to obtain a film, and (iv) polymerizing said film using UV light to give said dichroic liquid crystal film.

46. Method for the preparation of electro-optical and optical devices including security devices comprising polymerizing a mesogenic, polymerizable mixture according to claim 29 to form a polymer, and preparing the electro-optical and optical devices with the polymer.

47. Method for the preparation of electro-optical and optical devices including security devices comprising incorporating a dichroic liquid crystalline polymer film according to claim 37 into electro-optical and optical devices including security devices.

48. Electro-optical or optical component or a security device comprising a dichroic liquid crystalline polymer film formed from a mesogenic, polymerizable mixture according to claim 29.

49. Orientation layer comprising at least one polymerizable dichroic azo dye according to claim 1.

50. Orientation layer according to claim 49 further comprising rubbed polyimide, polyamide or a layer of photo-orientable material.

51. Method for the manufacture of optical or electro-optical components selected from the group consisting of structured and unstructured optical filters, polarizers and elements of security devices, comprising incorporating an orientation layer according to claim 49 in optical or electro-optical components selected from the group consisting of structured and unstructured optical filters, polarizers and elements of security devices.

* * * * *